(12) United States Patent
Sakamoto et al.

(10) Patent No.: US 11,030,290 B2
(45) Date of Patent: Jun. 8, 2021

(54) BIOLOGICAL DATA REGISTRATION SUPPORT DEVICE, BIOLOGICAL DATA REGISTRATION SUPPORT SYSTEM, BIOLOGICAL DATA REGISTRATION SUPPORT METHOD, BIOLOGICAL DATA REGISTRATION SUPPORT PROGRAM, RECORDING MEDIUM FOR STRONG BIOLOGICAL DATA REGISTRATION SUPPORT PROGRAM

(71) Applicant: NEC CORPORATION, Tokyo (JP)

(72) Inventors: Shizuo Sakamoto, Tokyo (JP); Shigeharu Sakayori, Tokyo (JP); Yumiko Tomizuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 29 days.

(21) Appl. No.: 16/070,987

(22) PCT Filed: Mar. 24, 2017

(86) PCT No.: PCT/JP2017/011958
§ 371 (c)(1),
(2) Date: Jul. 18, 2018

(87) PCT Pub. No.: WO2017/170203
PCT Pub. Date: Oct. 5, 2017

(65) Prior Publication Data
US 2019/0018944 A1    Jan. 17, 2019

(30) Foreign Application Priority Data
Mar. 31, 2016   (JP) .............................. JP2016-069991

(51) Int. Cl.
*G06K 9/00*    (2006.01)
*G06F 21/32*   (2013.01)
(Continued)

(52) U.S. Cl.
CPC ......... *G06F 21/32* (2013.01); *G06K 9/00892* (2013.01); *G06K 9/00926* (2013.01);
(Continued)

(58) Field of Classification Search
CPC ........................... G06F 21/32; G06K 9/00892; G06K 9/00926; G06K 9/0087; G06Q 20/40; G06T 7/00
(Continued)

(56) References Cited

U.S. PATENT DOCUMENTS 6,038,315 A * 3/2000 Strait .................... H04L 9/0662
382/115
6,850,252 B1 * 2/2005 Hoffberg ............ G06K 9/00369
348/E7.061

(Continued)

FOREIGN PATENT DOCUMENTS

JP    2000-186444 A    7/2000
JP    2002-168019 A    6/2002
(Continued)

OTHER PUBLICATIONS

Takuji Maeda, "A real authentication system for self-authentication", a monthly bar code, Japan, Japan Industrial Publishing Co., Ltd., Aug. 2, 2001, vol. 14, No. 9, p. 64-66.
(Continued)

*Primary Examiner* — Marceau Milord
(74) *Attorney, Agent, or Firm* — Sughrue Mion, PLLC

(57) ABSTRACT

A biological data registration support device includes: a control portion configured to acquire a plurality of registration scenarios, each including at least one verification method and associated with respective services, identify a verification method that is commonly included in the plurality of registration scenarios as a common verification method, and acquire one set of biological data for registration regarding the common verification method and one set
(Continued)

of biological data for registration regarding the verification method other than the common verification method; and a transmitting portion configured to transmit the biological data for registration and the plurality registration scenarios acquired by the control portion.

7 Claims, 19 Drawing Sheets

(51) Int. Cl.
  *G06T 7/00* (2017.01)
  *G06Q 20/40* (2012.01)
(52) U.S. Cl.
  CPC ............... *G06Q 20/40* (2013.01); *G06T 7/00* (2013.01); *G06K 9/00087* (2013.01)
(58) Field of Classification Search
  USPC .......................................................... 382/115
  See application file for complete search history.

(56) References Cited

U.S. PATENT DOCUMENTS

| | | | | |
|---|---|---|---|---|
| 7,685,432 | B2* | 3/2010 | Mochizuki | G06K 9/00 |
| | | | | 713/182 |
| 8,281,373 | B2* | 10/2012 | Fujii | G07C 9/37 |
| | | | | 726/5 |
| 8,443,201 | B2* | 5/2013 | Takahashi | G06F 21/32 |
| | | | | 713/186 |
| 8,571,881 | B2* | 10/2013 | Rousso | A61B 5/417 |
| | | | | 705/2 |
| 8,615,405 | B2* | 12/2013 | Rousso | A61B 5/417 |
| | | | | 600/431 |
| 8,775,814 | B2* | 7/2014 | Bidare | G07C 9/257 |
| | | | | 713/176 |
| 9,049,191 | B2* | 6/2015 | Inatomi | H04L 63/0861 |
| 9,137,438 | B2* | 9/2015 | Erhart | H04N 5/23219 |
| 9,386,017 | B2* | 7/2016 | Sakemi | H04L 63/0861 |
| 9,600,709 | B2* | 3/2017 | Russo | G06K 9/00006 |
| 9,660,991 | B2* | 5/2017 | Kamakari | H04L 63/0884 |
| 9,721,078 | B2* | 8/2017 | Cornick | H04L 9/3231 |
| 10,129,028 | B2* | 11/2018 | Kamakari | H04L 9/3073 |
| 10,484,182 | B2* | 11/2019 | Isshiki | G06F 11/1012 |
| 10,503,915 | B2* | 12/2019 | Isshiki | H04L 9/0861 |
| 2008/0178008 | A1* | 7/2008 | Takahashi | G07C 9/257 |
| | | | | 713/186 |
| 2008/0247540 | A1* | 10/2008 | Ahn | H04L 9/0877 |
| | | | | 380/44 |
| 2013/0212645 | A1* | 8/2013 | Takahashi | H04L 9/3093 |
| | | | | 726/3 |
| 2014/0331044 | A1* | 11/2014 | Fujii | H04L 9/3239 |
| | | | | 713/165 |
| 2015/0143497 | A1* | 5/2015 | Jin | G06F 21/32 |
| | | | | 726/7 |
| 2015/0195090 | A1* | 7/2015 | Obana | H04L 9/3231 |
| | | | | 380/30 |
| 2015/0281188 | A1* | 10/2015 | Sakemi | H04L 63/0861 |
| | | | | 713/171 |
| 2015/0334100 | A1* | 11/2015 | Isshiki | H04L 9/065 |
| | | | | 726/6 |
| 2016/0381003 | A1 | 12/2016 | Caceres et al. | |
| 2017/0085382 | A1* | 3/2017 | Kamakari | H04L 63/0407 |
| 2018/0350180 | A1* | 12/2018 | Onischuk | G07C 13/00 |

FOREIGN PATENT DOCUMENTS

| | | |
|---|---|---|
| JP | 2002-288424 A | 10/2002 |
| JP | 200350783 A | 2/2003 |
| JP | 2004-240645 A | 8/2004 |
| JP | 2005-063389 A | 3/2005 |
| JP | 2005130456 A | 5/2005 |
| JP | 2006-119851 A | 5/2006 |
| JP | 2006-172034 A | 6/2006 |
| JP | 2006-331169 A | 12/2006 |
| JP | 2007-048256 A | 2/2007 |
| JP | 2007-133528 A | 5/2007 |
| JP | 2007334707 A | 12/2007 |
| JP | 2011145906 A | 7/2011 |
| JP | 201373416 A | 4/2013 |
| JP | 2014-134986 A | 7/2014 |

OTHER PUBLICATIONS

Communication dated Jun. 11, 2019, from the Japanese Patent Office in counterpart application No. 2018-509228.
International Search Report for PCT/JP2017/011958 dated Jun. 13, 2017 (PCT/ISA/210).
Communication dated Nov. 24, 2020 from the Japanese Office Action in Application No. 2020-001674.

* cited by examiner

FIG. 3

| ID | SERVICE ① | | | SERVICE ② | | | ... | BIOLOGICAL DATA ① | | BIOLOGICAL DATA ② | | ... |
|---|---|---|---|---|---|---|---|---|---|---|---|---|
| | SERVICE NAME | REGISTRATION SCENARIO | ... | SERVICE NAME | REGISTRATION SCENARIO | ... | | TYPE | FILE | TYPE | FILE | |
| 123456 | WITHDRAWAL | FINGERPRINT, PASSWORD | | TRANSFER | FINGERPRINT, PASSWORD, FACE | | ... | FINGERPRINT | aaa.bmp | FACE | bbb.bmp | ... |
| 123567 | WITHDRAWAL | FINGERPRINT, VEIN | | TRANSFER | FINGERPRINT, VEIN | | ... | FINGERPRINT | ccc.bmp | VEIN | ddd.bmp | ... |
| 123678 | WITHDRAWAL | FINGERPRINT, PASSWORD | | TRANSFER | FINGERPRINT, VEIN | | ... | FINGERPRINT | eee.bmp | VEIN | fff.bmp | ... |
| ... | ... | ... | | ... | ... | | ... | ... | ... | ... | ... | ... |

FIG. 10

| ID | SERVICE ① | | | SERVICE ② | | | ... | BIOLOGICAL DATA① | | BIOLOGICAL DATA② | | BIOLOGICAL DATA③ | | ... |
|---|---|---|---|---|---|---|---|---|---|---|---|---|---|---|
| | SERVICE NAME | REGISTRATION SCENARIO | BACKUP SCENARIO | SERVICE NAME | REGISTRATION SCENARIO | BACKUP SCENARIO | ... | TYPE | FILE | TYPE | FILE | TYPE | FILE | ... |
| 123456 | WITHDRAWAL | FINGERPRINT, PASSWORD | VEIN, PASSWORD | TRANSFER | FINGERPRINT, PASSWORD, FACE | VEIN, PASSWORD, FACE | ... | FINGERPRINT | aaa.bmp | FACE | bbb.bmp | VEIN | ggg.bmp | ... |
| 123567 | WITHDRAWAL | FINGERPRINT, VEIN | | TRANSFER | FINGERPRINT, VEIN | | ... | FINGERPRINT | ccc.bmp | VEIN | ddd.bmp | | | ... |
| 123678 | WITHDRAWAL | FINGERPRINT, PASSWORD | | TRANSFER | FINGERPRINT, VEIN | | ... | FINGERPRINT | eee.bmp | VEIN | fff.bmp | | | ... |
| ... | ... | | | ... | | | ... | ... | | ... | | ... | | ... |

FIG. 12

CUSTOMER BIOLOGICAL INFORMATION REGISTRATION SCREEN  ID:123456

PLEASE SELECT THE SCENARIO TO BE USED FOR PERSONAL AUTHENTICATION NECESSARY TO RECEIVE EACH SERVICE. PLEASE SELECT A BACKUP SCENARIO AS NECESSARY.

| SERVICE | SCENARIO | REGISTRATION | BACKUP |
|---|---|---|---|
| WITHDRAWAL | FINGERPRINT, PASSWORD | ⊙ | ○ |
|  | VEIN, PASSWORD | ○ | ⊙ |
| TRANSFER | FINGERPRINT, PASSWORD, FACE | ○ | ○ |
|  | VEIN, PASSWORD, FACE | ○ | ⊙ |
|  | FINGERPRINT, PASSWORD, FACE | ⊙ | ○ |

RETURN    OK

FIG. 15

| VERIFICATION METHOD | SECURITY VALUE |
|---|---|
| FINGERPRINT VERIFICATION METHOD | P |
| VEIN VERIFICATION METHOD | Q |
| FACE VERIFICATION METHOD | R |
| PASSWORD VERIFICATION METHOD | S |
| ... | ... |

FIG. 16

| SERVICE | PREDETERMINED CONDITION |
|---|---|
| TRANSFER | SCENARIO SECURITY VALUE > p |
| WITHDRAWAL | SCENARIO SECURITY VALUE > q |
| DEPOSIT | SCENARIO SECURITY VALUE > r |
| BALANCE INQUIRY | SCENARIO SECURITY VALUE > s |
| ... | ... |

BIOLOGICAL DATA REGISTRATION SUPPORT DEVICE, BIOLOGICAL DATA REGISTRATION SUPPORT SYSTEM, BIOLOGICAL DATA REGISTRATION SUPPORT METHOD, BIOLOGICAL DATA REGISTRATION SUPPORT PROGRAM, RECORDING MEDIUM FOR STRONG BIOLOGICAL DATA REGISTRATION SUPPORT PROGRAM

CROSS REFERENCE TO RELATED APPLICATIONS

This application is a National Stage of International Application No. PCT/JP2017/011958 filed Mar. 24, 2017, claiming priority based on Japanese Patent Application No. 2016-069991, filed Mar. 31, 2016, the content of which is incorporated herein by reference.

TECHNICAL FIELD

The present invention relates to a biological data registration support device, a biological data registration support system, a biological data registration support method, a biological data registration support program, and a biological data registration support program that supports registration of biological data used for verification.

BACKGROUND ART

In recent years, banking services using ATMs (automatic teller machines) and electronic commerce involving the buying and selling of goods and services on a computer network have come to be actively performed. Along with this, advanced security systems against losses arising from impersonation of pre-registered users and systems for enhancing user convenience have been developed.

Patent Document 1 discloses a system that stores a transaction type and a transaction amount in advance in association with a rank indicating a security level, and restricts transactions to be performed by a user based on a rank determined in accordance with the card type used by the user and an identity verification method.

Patent Document 2 discloses a system that simplifies operations by a user by setting a plurality of identification numbers for one cash card and performing processing associated with the inputted identification number.

Patent Document 3 discloses a system that stores bank transaction contents in association with finger types and provides a transaction corresponding to the finger type of the finger presented by a user in order to perform vein authentication.

Patent Document 4 discloses a system that allows users to set respective usage conditions for transactions using devices without biological authentication and transactions using devices with biological authentication.

PRIOR ART DOCUMENTS

Patent Documents

[Patent Document 1] Japanese Unexamined Patent Application, First Publication No. 2002-288424
[Patent Document 2] Japanese Unexamined Patent Application, First Publication No. 2005-063389
[Patent Document 3] Japanese Unexamined Patent Application, First Publication No. 2006-172034
[Patent Document 4] Japanese Unexamined Patent Application, First Publication No. 2006-331169

DISCLOSURE OF THE INVENTION

Problems to be Solved by the Invention

However, the above-mentioned patent documents do not describe how to acquire and register biological data of a user in a system enabling authentication using a plurality of verification methods such as fingerprint authentication, vein authentication and the like. For this reason, it has not been possible to efficiently perform registration of biological data in authentication using a plurality of verification methods. It is therefore an object of the present invention to provide a biological data registration support device that efficiently performs registration of biological data in authentication using a plurality of verification methods.

Means For Solving the Problems

The first system of the present invention has a control portion configured to acquire a plurality of registration scenarios, each including at least one verification method and associated with respective services, identify a verification method that is commonly included in the plurality of registration scenarios as a common verification method, and acquire one set of biological data for registration regarding the common verification method and one set of biological data for registration regarding the verification method other than the common verification method; and a transmitting portion configured to transmit the biological data for registration and the plurality of registration scenarios acquired by the control portion.

Effects of the Invention

According to the present invention, it is possible to provide a biological data registration support device that efficiently performs registration of the biological data in authentication using a plurality of verification methods.

BRIEF DESCRIPTION OF THE DRAWINGS

FIG. 3 is a drawing showing an example of data stored by the customer database 150 in the first exemplary embodiment.

FIG. 10 is a drawing showing an example of data stored by the customer database 151 in the second exemplary embodiment.

FIG. 12 is a drawing showing an example of the display by the display portion 190 in the second exemplary embodiment.

FIG. 15 is a drawing showing an example of data stored by the verification method database 152 in the third exemplary embodiment.

FIG. 16 is a drawing showing an example of data stored by the service database 156 in the third exemplary embodiment.

EXEMPLARY EMBODIMENTS FOR CARRYING OUT THE INVENTION

Hereinafter, exemplary embodiments of the present invention will be described in detail with reference to the drawings. However, the constituent elements described in the following exemplary embodiments are examples, and the technical scope of the present invention is not limited thereto.

Figure 1:
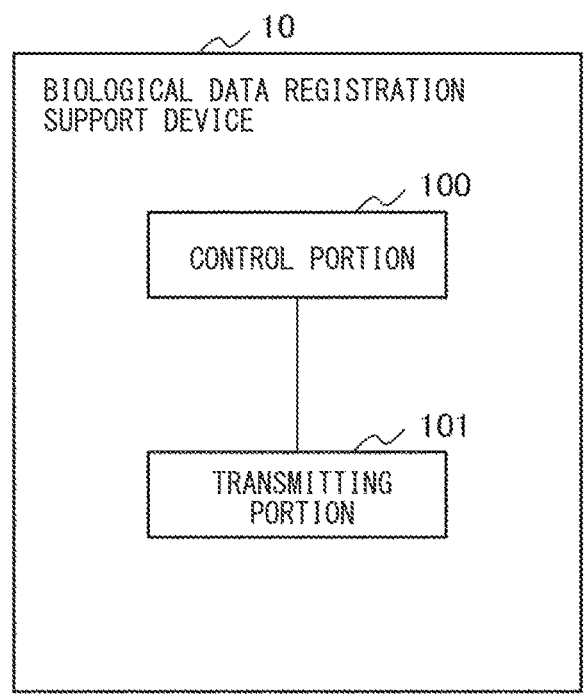
FIG. 1 is a block diagram showing a configuration example of a first exemplary embodiment.

First Exemplary Embodiment (Outline of First Exemplary Embodiment)
A configuration example of the first exemplary embodiment will be described. FIG. 1 is a block diagram showing the outline of the biological data registration support device 10 according to the first exemplary embodiment. The biological data registration support device 10 includes a control portion 100 and a transmitting portion 101. The biological data registration support device 10 may be an information processing device such as a PC, a smartphone, a tablet terminal, a wearable terminal, or the like.

First, the control portion 100 acquires a plurality of registration scenarios, each consisting of at least one verification method. The control portion 100 may acquire the registration scenarios from other constituent elements of the biological data registration supporting device 10. Alternatively, the control portion 100 may acquire the registration scenarios transmitted from an external device. Here, the verification method may be a method of collating two or more sets of biological information such as a fingerprint verification method, a palmprint verification method, a vein verification method, a face verification method, an iris verification method, a voiceprint verification method, and the like. Verification by these verification methods is realized by an algorithm corresponding to the type of biological information. Biological information refers to information on biological features or behavioral features of human beings. It is to be noted that although the verification method may be a method of verifying information other than biological information such as a password and a gesture, it is preferable that at least one of the verification methods acquired by the control portion 100 be a verification method using biological information. In other words, the registration scenario consists of one verification method or a combination of a plurality of verification methods, and preferably includes at least one verification method using biological data.

Also, each registration scenario is associated with a service. A service according to the present invention means a service that a user can receive when, as a result of collating information registered in advance and information newly acquired from the user, it is verified that the user is the same as a person registered in advance. Specifically, in the case of a bank, services such as depositing, withdrawing, transferring, balance inquiry, and the like correspond to services. Further, in the case of electronic commerce, mediation such as purchase and exhibition of merchandise, settlement and the like correspond to services. Services in the present invention are not limited to those provided in banks and electronic commerce.

Correspondence between a registration scenario and a service means that data capable of specifying the verification method and data capable of specifying the service are associated, for example, as shown in FIG. 3. Data that can specify the registration scenario and data that can specify the service may already be associated when the control portion 100 has acquired these sets of data. Alternatively, after the control portion 100 has acquired these sets of data, the control portion 100 or another constituent element may associate these sets of data.

The control portion 100 specifies, as a common verification method, a verification method commonly included in the acquired registration scenarios, and acquires one set of biological data for registration regarding the common verification method. Biological data means data representing biological characteristics or behavioral features of a human such as fingerprint image data, vein image data, face image data, iris image data, voice data, and the like. Biological data regarding the verification method refers to biological data used in the verification method. For example, biological data regarding the verification method may be fingerprint image data if the verification method is a fingerprint verification method and face image data if the verification method is a face verification method.

The control portion 100 may acquire biological data for registration from an acquiring portion. The acquiring portion may be a component in the biological data registration support device 10 or may be a component in another device connected to the biological data registration support device 10. A hardware device that realizes the acquiring portion may be a camera, a scanner, or the like that generates image data by capturing the image of a fingerprint, a vein, a face, an iris, or the like. Further, the acquiring portion may be a device that generates voice data from a voice input from a microphone.

For example, in the case of the control portion 100 having acquired two registration scenarios, it will be assumed that the first registration scenario consists of a fingerprint verification method and a password verification method, and the second registration scenario consists of a fingerprint verification method and a vein verification method. In this case, the control portion 100 specifies the fingerprint verification method, which is included in both of the two registration scenarios, as the common verification method. Then, the control portion 100 controls the acquiring portion so as to acquire one set of biological data regarding the fingerprint verification method, which is the common verification method, that is, one set of fingerprint image data. Then, the control portion 100 acquires the one set of fingerprint image data from the acquiring portion. Hereinafter, the biological data acquired by the control portion 100 from the acquiring portion is referred to as biological data for registration.

Moreover, the control portion 100 acquires from the acquiring portion one set of biological data for registration regarding a verification method other than the common verification method, among the verification methods included in the acquired registration scenarios. That is, the control portion 100 acquires one set of biological data, that is, one set of vein image data, regarding the vein method, which is not a verification method commonly included in the two registration scenarios mentioned above. The password verification method, which is a verification method other than the common verification method, is a verification method that does not use biological data. Therefore, the control portion 100 does not need to cause the acquiring portion to acquire biological data regarding the password verification method.

While the control portion 100 may sequentially acquire a plurality of sets of biological data from the acquiring portion, by deleting all except one thereamong or combining the plurality of sets of biological data, the control portion 100 may finally acquire one set of biological data regarding one verification method.

The transmitting portion 101 transmits the biological data for registration acquired by the control portion 100 and the plurality of registration scenarios. The biological data for registration transmitted by the transmitting portion 101 is collated with, for example, biological data acquired at the time of user authentication. In other words, the biological data transmitted by the transmitting portion 101 in the present exemplary embodiment is biological data registered with regard to the user receiving a service.

According to the present exemplary embodiment, it is possible to provide a biological data registration support device that efficiently performs registration of biological data in authentication using a plurality of verification methods in order to appropriately acquire biological data regarding verification methods included in registration scenarios.
(Constitution of First Exemplary Embodiment)
<Registration of Biological Data>

Figure 2:
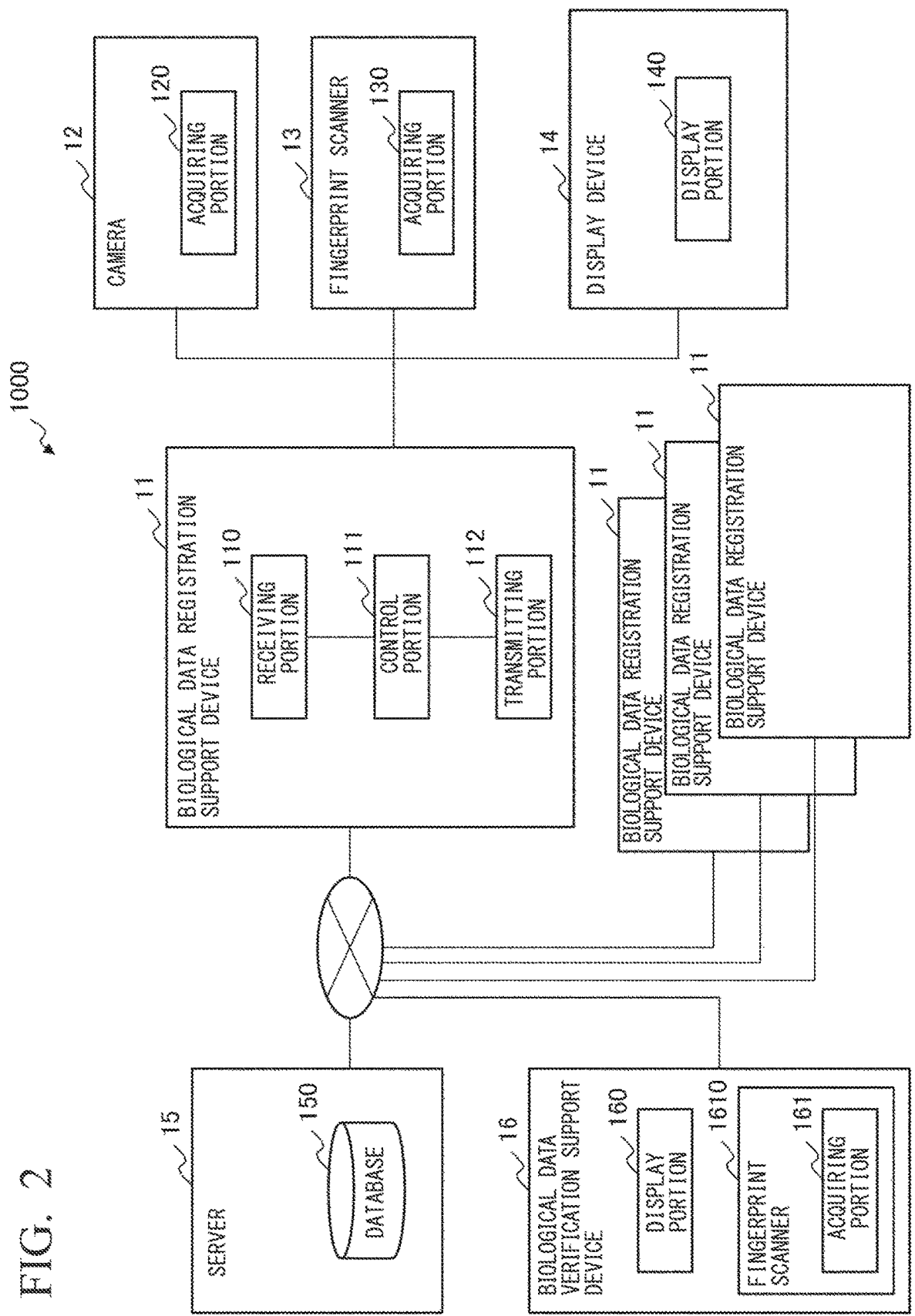
FIG. 2 is a block diagram showing a configuration example of the first exemplary embodiment.

Although the present invention can be implemented with the above constitution, a more specific configuration example will be described below. In this configuration example, it is assumed that the customer's biological data is registered or verified in a bank system. FIG. 2 is a block diagram showing a configuration example of a biological data registration support system 1000 according to the first exemplary embodiment. The biological data registration support system 1000 includes a biological data registration support device 11, a camera 12, a fingerprint scanner 13, a display device 14, a server 15, and a biological data verification support device 16. The biological data registration support system 1000 is a bank system used for registering or verifying customer information at banks.

Each biological data registration support device 11 is arranged at a bank branch or the like, and is connected to the biological data verification support device 16 and the server 15 via a network. The biological data registration support device 11 is connected in a communicable manner with the camera 12, the fingerprint scanner 13, and the display device 14. The camera 12 is, for example, a camera having a CCD (Charge Coupled Device) sensor, a CMOS (Complementary Metal Oxide Semiconductor) sensor, an image processor and the like. An acquiring portion 120 in the camera 12 converts light from the subject received by the CCD sensor or the CMOS sensor to generate face image data. The fingerprint scanner 13, while similarly being a device having a CCD sensor, a CMOS sensor, an image processor and the like, in particular has a structure suited to fingerprint imaging. An acquiring portion 130 in the fingerprint scanner 13 converts light from the subject received by the CCD sensor or the CMOS sensor to generate fingerprint image data.

The display device 14 may be a device provided with a display portion 140 such as a liquid crystal display, a CRT display, or the like. Further, the display device 14 may be provided with an input portion such as a touch panel capable of input by touch from the outside. The server 15 may be a computer capable of exchanging information with a plurality of client terminals. The biological data verification support device 16 is provided with a device capable of generating and acquiring biological data such as a scanner, a camera, a recording device, and the like. The biological data verification support device 16 may be an ATM or the like that provides a banking service.

The control portion 111 in the biological data registration support device 11 acquires candidate scenarios consisting of at least one verification method. A candidate scenario is a scenario displayed to the user as a candidate for the registration scenario. The control portion 111 may acquire candidate scenarios by reading candidate scenarios stored in a storage portion. The storage portion may be a constituent element in the biological data registration support device 11 or may be a constituent element of an external device. Alternatively, the control portion 111 may acquire a candidate scenario received by a receiving portion 110 from an external device.

The control portion 111 controls the display device 14 to display the acquired candidate scenarios in the display portion 140. At this time, the control portion 111 controls the display device 14 so as to display the candidate scenarios and the services associated with the candidate scenarios in association with each other. Note that when the control portion 111 acquires a candidate scenario, the candidate scenario may be associated with a service. Alternatively, after the control portion 111 has acquired a candidate scenario, the control portion 111 may associate a service with the candidate scenario. The association of a candidate scenario and a service means that data that can specify a candidate scenario and data that can specify a service are associated with each other.

In addition, the control portion 111 acquires the candidate scenario received by the receiving portion 110 from the display device 14 as a registration scenario, and acquires the service associated with the registration scenario. After that, the control portion 111 acquires the biological data for registration regarding the common verification method included in the registration scenario, through the operation described in "Outline of the first exemplary embodiment". Moreover, the control portion 111 causes a transmitting portion 112 to transmit the biological data for registration that has been acquired, the plurality of registration scenarios, and the services associated with the registration scenarios.

The receiving portion 110 receives from the display device 14 the candidate scenario selected by the clerk in accordance with the request of the customer, and transmits the candidate scenario to the control portion 111.

The transmitting portion 112 transmits the candidate scenario acquired by the control portion 111 to the display device 14. In addition, the transmitting portion 112 transmits the biological data for registration acquired by the control portion 111, the plurality of registration scenarios, and the services associated with the registration scenarios to the server 15.

The display portion 140 displays the candidate scenarios acquired from the control portion 111 in association with services. Then, the input portion in the display device 14 is used to input the candidate scenario selected by the employee, out of the candidate scenarios displayed by the display portion 140. Then, the display device 14 acquires the candidate scenario selected by the employee from the input portion, and transmits the acquired candidate scenario to the biological data registration support device 11 together with the corresponding service.

The fingerprint scanner 13 is activated upon receiving a signal from the control portion 111. The acquiring portion 130 captures an image of the fingerprint of a finger placed on the fingerprint scanner 13 by the customer, and generates and acquires fingerprint image data. Note that the imaging of the fingerprint by the acquiring portion 130 may also be performed in accordance with a signal from the control portion 111.

The camera 12 is activated upon receiving a signal from the control portion 111. In accordance with a signal from the control portion 111, the acquiring portion 120 captures an image of the customer's face, and generates and acquires face image data. Note that the imaging of the face by the acquiring portion 120 may also be performed when a button or the like provided on the camera 12 is pressed.

A customer database 150 in the server 15 stores the biological data for registration, registration scenarios, and services that were received by the receiving portion in the server 15 in association with each other. FIG. 3 shows an example of data stored in the customer database 150. From FIG. 3, for example, for the customer with ID 123456, the fingerprint verification method and the password verification method are associated with the service of "withdrawal", and the fingerprint verification method, the password verification method, and the face verification method are associated with the service of "transfer". Further, for ID 123456, fingerprint image data and face image data are associated as biological information of the customer concerned. Note that the format of the biological data in FIG. 3 is BMP (bitmap image), but the format of the biological data is not limited thereto.

<Verification of Biological Data>

The verification of biological data in the biological data support registration system 1000 will be described. The biological data verification support device 16 may be an ATM installed in a bank branch, a convenience store, a supermarket or the like. An ATM is a device that accepts input from customers and provides banking services. The biological data verification support device 16 includes an acquiring portion 161 and a display portion 160. The acquiring portion 161 acquires biological data of the customer. For example, the acquiring portion 161 may be a camera, a scanner, or the like that generates image data by imaging a fingerprint, a vein, a face, an iris, or the like. Alternatively, the acquiring portion 161 may be a device that generates voice data from a voice input from the microphone. The display portion 16 may be, for example, a device including a liquid crystal display, a cathode-ray tube display, or the like. The display portion 16 may be provided with an input portion such as a touch panel capable of input by touch from the outside. In FIG. 2, a fingerprint scanner 1610 is described as an example of the acquiring portion 161.

When the customer inserts a cash card or the bank passbook into the biological data verification support device 16, the control portion in the biological data verification support device 16 recognizes the ID number of the customer. Note that the control portion may recognize the account number, the customer's name, etc. in place of the ID number or along with the ID number. Then, the control portion causes the display portion 160 to display a list of services that the biological data verification support device 16 can provide to the customer. When the customer selects a service via the input portion in the biological data verification support device 16, the control portion transmits the ID number and the selected service to the server 15 via the transmitting portion.

The server 15 searches the database 150 and transmits the registration scenario and the biological data for registration associated with the received ID number and the received service to the biological data verification support device 16. For example, when the ID number is "123546" and the service selected by the customer is "withdrawal", from FIG. 3, the server 15 transmits the registration scenario consisting of "fingerprint verification method" and "password verification method" and the fingerprint image data "aaa.bmp". Further, the server 15 may transmit the password associated with the ID number "123546". The password may be stored in the database 150 together with the fingerprint image data or the like, or may be stored in another database. The biological data verification support device 16 performs a display for acquiring from the customer biological data regarding the registration scenario received from the server 15. That is, the display portion 160 displays a message prompting the customer to provide fingerprint image data.

Figure 4:
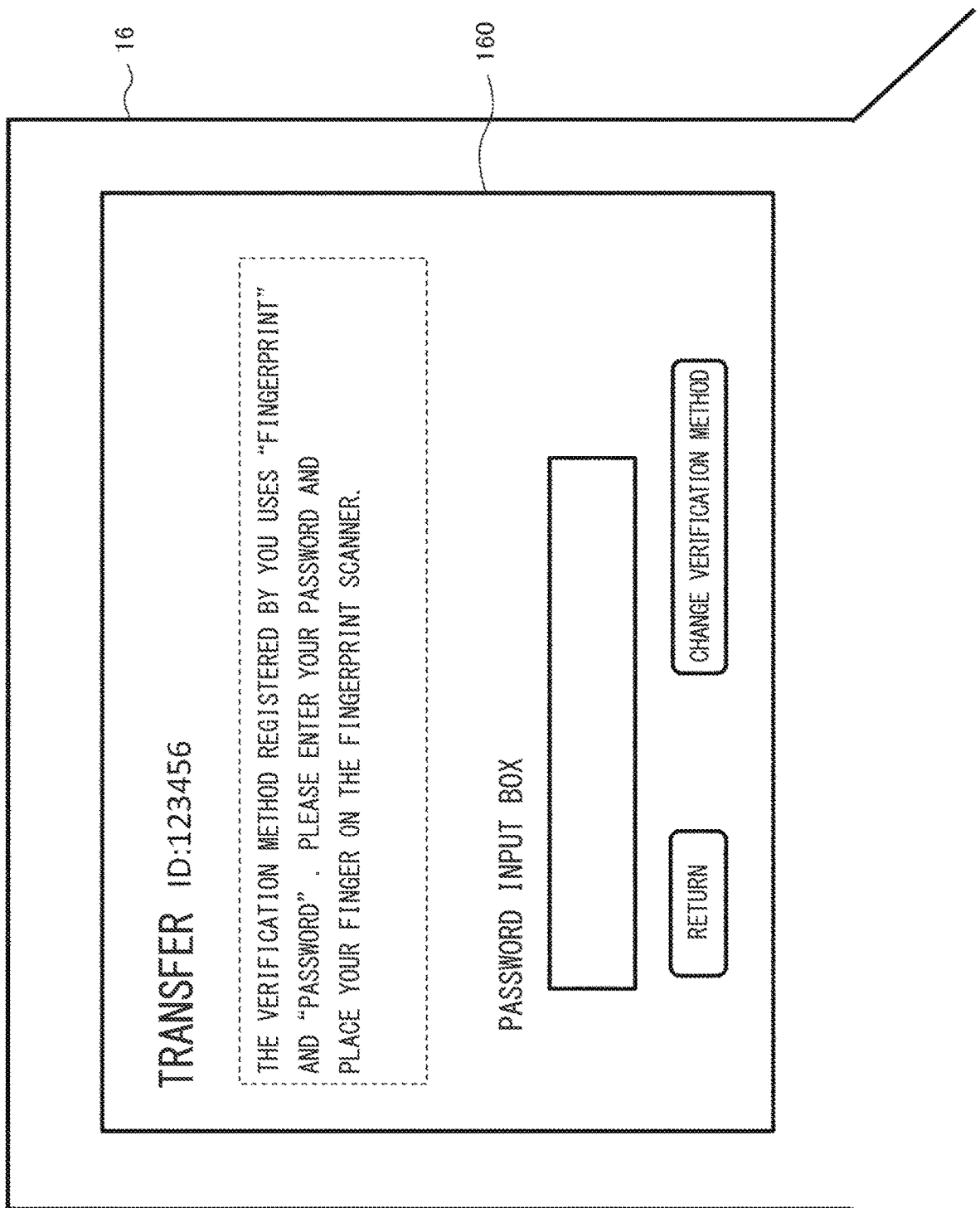
FIG. 4 is a drawing showing an example of display by the display portion 160 in the first exemplary embodiment.

An example of the display by the display portion 160 is shown in FIG. 4. As shown in FIG. 4, the display portion 160 displays, for example, "The verification method registered by you uses 'fingerprint' and 'password'. Please enter your password and place your finger on the fingerprint scanner, which is the acquiring portion 161." A customer who sees the display inputs the password that he thinks is correct using an input portion such as a touch panel. Then, the customer places his finger on the fingerprint scanner. The acquiring portion 161 creates fingerprint image data after the finger of the customer has been placed. Note that the order of input of biological data and password by the user is not limited thereto.

Then, the control portion in the biological data verification support device 16 collates the password input by the input portion with the password received from the server 15. Furthermore, the control portion verifies the fingerprint image data acquired from the acquiring portion 161 with the fingerprint image data received from the server 15. In the case where the verification of the password and the verification of the fingerprint image data are both successful, the control portion provides the service to the customer. For example, money that the customer has deposited in the bank is transferred to a destination account. When at least one of the password verification and the fingerprint image data verification fails, the control portion displays on the display portion 160 an indication that the password or fingerprint image data is incorrect, and again prompts the user to reenter the password and the fingerprint image data.

Here, the case will be supposed that the customer cannot input the biological data for some reason, or refuses to input the data. For example, there are cases where it is difficult to acquire clear fingerprint image data from a customer due to the finger being injured. At that time, it is preferable that the customer be able to change the fingerprint verification method to another verification method. Changing of the verification method may be accomplished, for example, by the customer selecting "modification of verification method" shown in FIG. 4. When the control portion in the biological data verification support device 16 recognizes that "change of verification method" has been selected, the control portion may transmit a one-time password to the previously registered e-mail address of the customer, and perform the verification using the one-time password.

The mode of changing the verification method is not limited thereto, and may be changed to a verification method using a second and third password registered in advance, or may be changed to a verification method using information that only the customer can know (such as the name of a pet, formerly attended school, or the like). Alternatively, the verification method may be made unchangeable, and when the customer cannot use the verification method included in the registration scenario, the provision of the service via the biological data verification support device 16 may be stopped and the customer may be guided to the teller. In the case where the customer rejects the verification method included in the registration scenario, the biological data verification support device 16 may perform a uniform processing for all customers.

(Operation of First Exemplary Embodiment)

Figure 5:
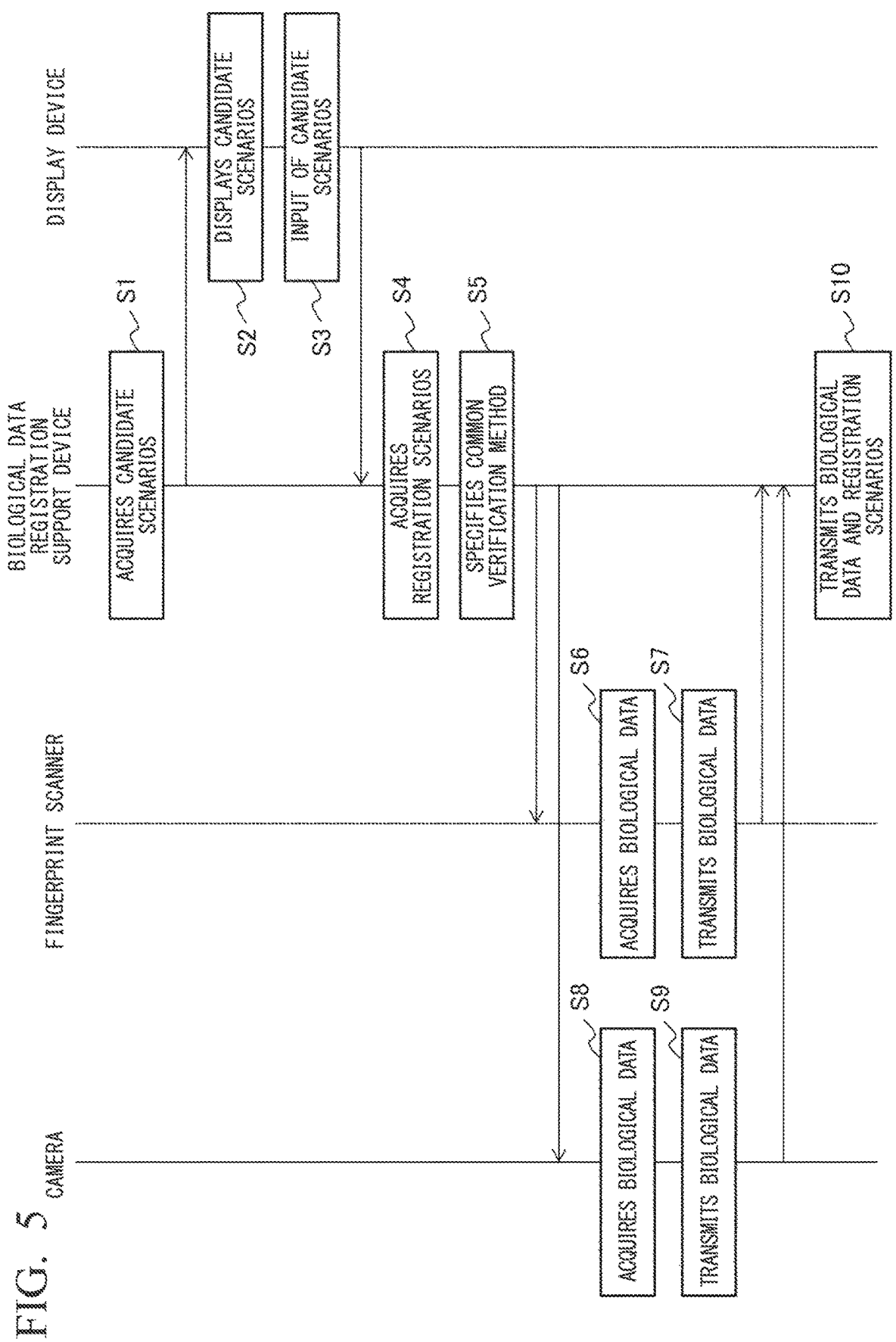
FIG. 5 is a sequence diagram showing an example of the operation of the first exemplary embodiment.

FIG. 5 is a sequence drawing showing an example of the operation of the first exemplary embodiment when registering biological data. The display device 14 is assumed to be a display having a touch panel. First, the bank customer goes to the window of a bank branch and informs the clerk that he wishes to register personal authentication using biological information. Then, the clerk performs an operation to activate an application stored in advance by the biological data registration support device 11. Thereafter, the clerk inputs the customer's ID number into the biological data registration support device 11 and starts the process of registering the biological data of the customer. Then, the control portion 111 in the biological data registration support device 11 acquires candidate scenarios consisting of at least one verification method (S1). The control portion 111 may acquire candidate scenarios by reading the candidate scenarios stored in the storage portion. Alternatively, the control portion 111 may acquire the candidate scenarios received by the receiving portion 110 from an external device.

Then, the control portion 111 controls the display device 14 to display the acquired candidate scenarios in the display portion 140 (S2). At this time, the control portion 111 controls the display device 14 so as to display the candidate scenarios and the services associated with the candidate scenarios in a corresponding manner. When the control portion 111 acquires the candidate scenarios, the candidate scenarios may be associated with the services. Alternatively, after the control portion 111 acquires the candidate scenarios, the control portion 111 may associate the services with the candidate scenarios.

Figure 6:
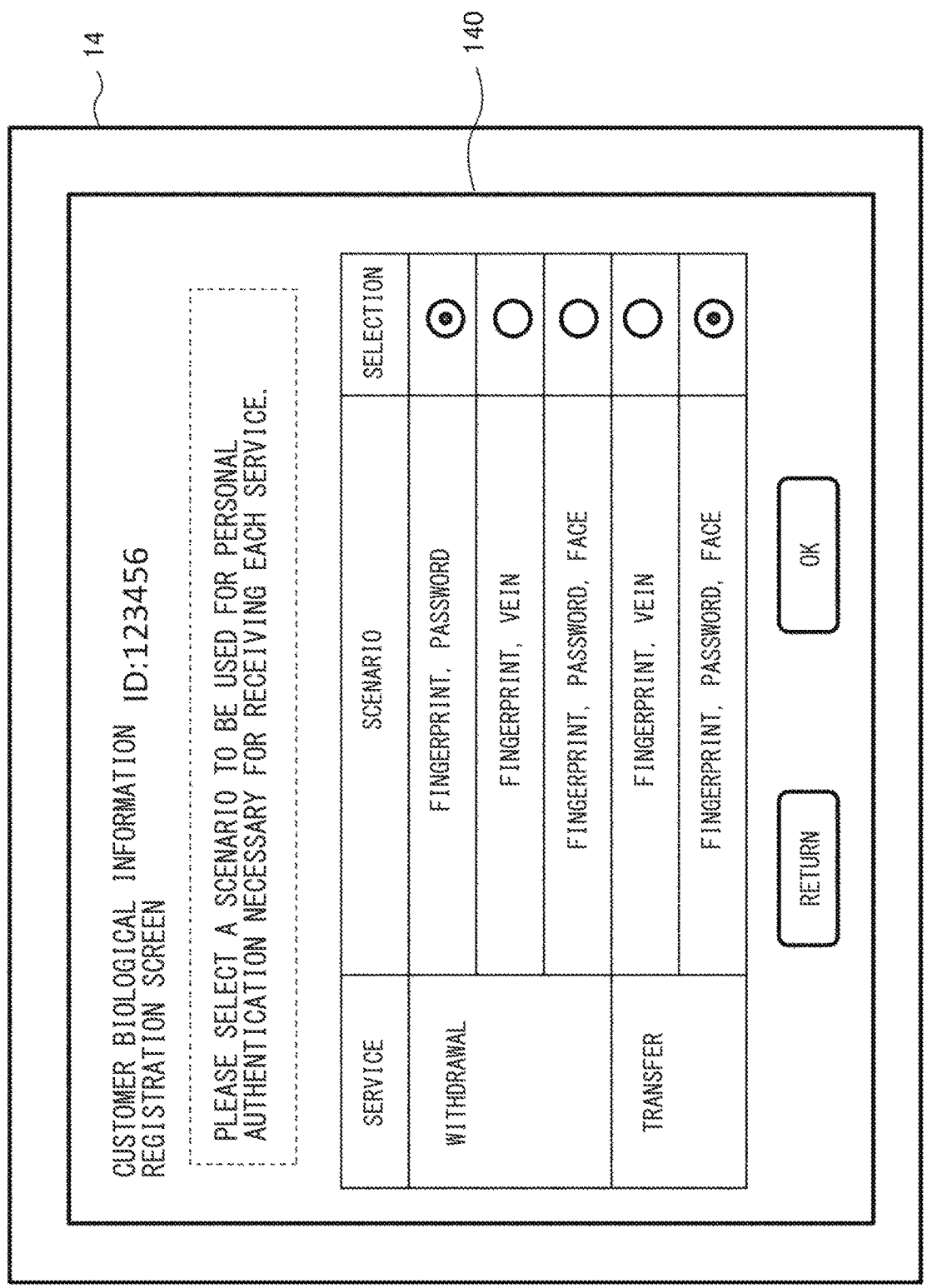
FIG. 6 is a drawing showing an example of a display by the display device 14 in the first exemplary embodiment.

FIG. 6 shows an example of display by the display device 14. In FIG. 6, a display allowing selection of candidate scenarios is shown together with the guidance sentence "Please select a scenario to be used for personal authentication necessary for receiving each service." As shown in FIG. 6, the service of "withdrawal" is associated with a first candidate scenario consisting of the fingerprint verification method and the password verification method, a second candidate scenario consisting of the fingerprint verification method and the vein verification method, and a third candidate scenario consisting of the fingerprint verification method, a password and the face verification method. The service of "transfer" is associated with a fourth candidate scenario consisting of the fingerprint verification method and the vein verification method and a fifth candidate scenario consisting of the fingerprint verification method, the password verification method, and the face verification method.

Next, the clerk confirms the display device 14 and asks the customer which candidate scenario he wishes to use when receiving each service. For example, suppose that the customer is aware that it is impossible to obtain a clear vein image due to his blood circulation being poor. Therefore, the customer requests to use a candidate scenario not including the vein authentication method and consisting of a small number of authentication methods. Then, the clerk selects the radio button displayed by the display device 14 in order to select the candidate scenario desired by the customer for each service. FIG. 6 shows the display of the display device 14 in the case where the clerk selects the first candidate scenario for the service of "withdrawal" and selects the fifth candidate scenario for the service of "transfer". Then, the clerk selects the "OK" button when the selection of the candidate scenarios is completed.

The input portion on the display portion 140 inputs the candidate scenarios selected by the clerk via the touch panel (S3). Then, the display device 14 transmits the candidate scenarios selected by the clerk, along with the corresponding services, to the biological data registration support device 11. The control portion 111 in the biological data registration support device 11 acquires the candidate scenarios received by the receiving portion 110 as registration scenarios corresponding to the services transmitted together with the candidate scenarios (S4). That is, the control portion 111 acquires the first registration scenario consisting of the fingerprint verification method and the password verification method, and the second registration scenario consisting of the fingerprint verification method, the password verification method, and the face verification method. From FIG. 6, the first registration scenario corresponds to the "withdrawal" service, and the second registration scenario corresponds to the "transfer" service.

Next, the control portion 111 specifies the verification method that is commonly included in the acquired plurality of registration scenarios as a common verification method (S5). For example, the control portion 111 specifies the fingerprint verification method, which is the verification method commonly included in the first registration scenario and the second registration scenario, as the common verification method.

Then, the control portion 111 causes the acquiring portion 120 and the acquiring portion 130 to acquire one set of biological data for registration regarding the common verification method and one biological data for registration regarding the verification method other than the common verification method (S6, S8). For example, the control portion 111 controls the fingerprint scanner 13 to cause the acquiring portion 130 to acquire one set of biological data regarding the common verification method, that is, fingerprint image data. Specifically, the fingerprint scanner 13 is activated upon receiving a signal from the control portion 111. Then, after the customer places his finger on the fingerprint scanner 13, the acquiring portion 130 images the fingerprint of the customer and generates/acquires fingerprint image data. Note that the imaging of the fingerprint by the acquiring portion 130 may also be performed in accordance with a signal from the control portion 111.

Moreover, the control portion 111 controls the camera 12 and causes the acquiring portion 120 to acquire one set of biological data regarding a verification method other than the common verification method, that is, face image data. Specifically, the camera 12 is activated upon receiving a signal from the control portion 111. Then, the acquiring portion 120 captures an image of the face of the customer in accordance with the signal from the control portion 111, and generates/acquires face image data. It is to be noted that the imaging of the face by the acquiring portion 120 may also be performed when a button or the like provided on the camera 12 is depressed. Although the password authentication method is a verification method other than the common verification method, biological data regarding the password verification method is not acquired since biological data is not used in the password authentication method.

The biological data acquired by the acquiring portion 120 and the acquiring portion 130 is transmitted to the biological data registration support device 11 by the transmitting portion (S7, S9). Then, the control portion 111 in the biological data registration support device 11 acquires one set of fingerprint image data and one set of face image data from the receiving portion 110. While the control portion 111 may sequentially acquire a plurality of sets of biological data from the fingerprint scanner 13 or the camera 12, the control portion 111 ultimately acquires one set of biological data for registration regarding one verification method by deleting all but one from the storage portion or synthesizing data.

Next, the control portion 111 causes the transmitting portion 112 to transmit one set of fingerprint image data regarding the fingerprint authentication method, one set of face image data regarding the face authentication method, the above-described first registration scenario, and the second registration scenario (S8). For example, the transmitting portion 112 transmits one set of fingerprint image data, one set of face image data, the first registration scenario, and the second registration scenario to the server 15. At this time, the control portion 111 may cause the transmitting portion 112 to transmit information for identifying the customer, for example, an ID number.

Then, the server 15 may store the ID number, the one set of fingerprint image data, the one set of face image data, the first registration scenario, and the second registration scenario in the customer database. By the above operation, the registration of the biological data of the customer is completed.

In the present exemplary embodiment, since a plurality of candidate scenarios can be acquired and displayed for one service, the user of the biological data registration support device 11 can select and register a candidate scenario to be used from among the plurality of candidate scenarios. For that reason, the user can select a scenario that takes into consideration the characteristics of the user's own body or a scenario toward which the user is less prone to feel resistance. Therefore, the body data registration support device 11 of the present exemplary embodiment can further improve the user's convenience.

In the present exemplary embodiment, the display device 14 was assumed to be a display having a touch panel, but the biological registration support device 11 may have a display corresponding to the display device 14. The biological data registration support device 11 may be a desktop PC (personal computer), a smartphone, a notebook PC, or the like. Furthermore, the input portion may be realized by an input device such as a mouse, a keyboard, or the like.

Although the camera and the fingerprint scanner are used as devices for acquiring biological data, the present invention is not limited thereto. For example, a palm print scanner for imaging a palm print image, a vein scanner for imaging a vein image, a recording device for acquiring a voice print, and the like may acquire biological data. Furthermore, the device for acquiring the biological data and the display device may be provided in the biological data registration supporting device 11. For example, a fingerprint scanner or camera in a tablet terminal may acquire biological data.

The biological data registration support device 11 may transmit the acquired biological data and registration scenarios to devices other than the server 15. For example, the biological data registration support device 11 may transmit the acquired registration scenarios and biological data to a specific device different from the server 15. The specific device may be a storage portion of a customer's cash card, for example, a device that stores biological data for registration in an IC (Integrated Circuit) chip. In this case, the customer's biological data for registration is not stored in the server. Therefore, the biological data verification support device 16 may read biological data for registration from the customer's IC card and perform authentication by collation with the biological data acquired from the customer.

Furthermore, in the present exemplary embodiment, the biological data registration support device 11 was described as being operated by a bank clerk, but the customer himself may operate the biological data registration support device 11 to perform registration of biological data. In addition, in the present exemplary embodiment, the customer operated the biological data verification support device 16, but a clerk may also operate the biological data verification support device 16.

In the present exemplary embodiment, the biological data verification support device 16 was described as being an ATM, but it is not limited thereto. For example, in the case where the present invention is applied to electronic commerce, the biological data verification support device 16 may be a desktop PC, a notebook PC, a tablet terminal, a smartphone, or the like.

<Proposed Scenario>

Figure 7:
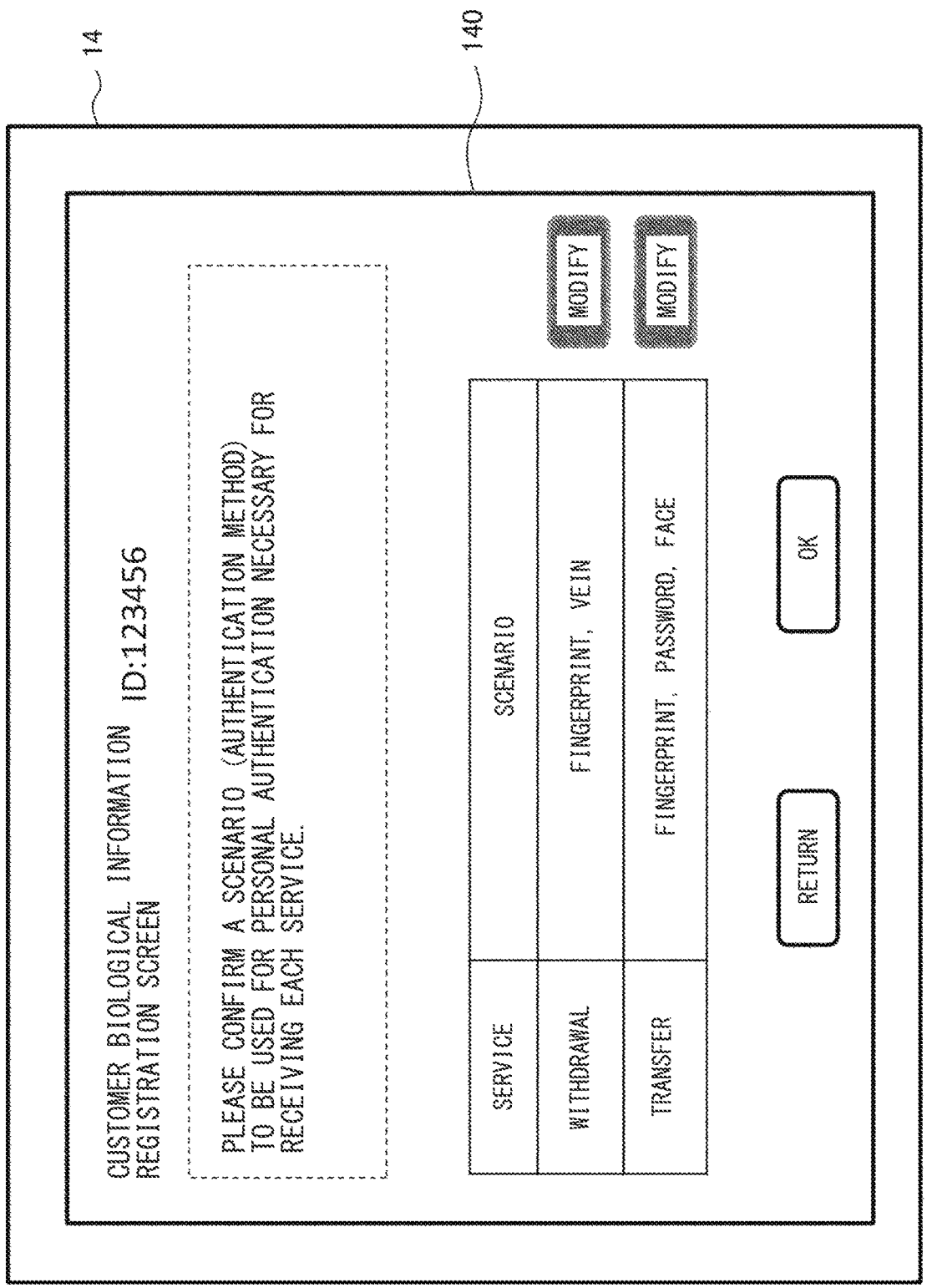
FIG. 7 is a drawing showing an example of a display by the display portion 140 in a modification of the first exemplary embodiment.

Next, a modification of the first exemplary embodiment will be described. In the modification of the first exemplary embodiment, the control portion 111 causes the display portion 140 to display proposed scenarios consisting of at least one verification method in association with services. Prior to the display of candidate scenarios in the first exemplary embodiment, the control portion 111 causes the display portion 140 to display the proposed scenarios. While a proposed scenario is similar to the candidate scenario in that it consists of at least one verification method, it is preferable that one proposed scenario be associated with one service. That is, a proposed scenario is a scenario proposed by the biological data registration support terminal 11 to the customer. FIG. 7 shows an example of display of proposed scenarios by the display portion 140. As shown in FIG. 7, the display portion 140 displays a proposed scenario comprising the fingerprint verification method and the vein verification method in association with the "withdrawal" service. In addition, the display portion 140 displays a proposed scenario including the fingerprint verification method, the password verification method, and the face verification method in association with the "transfer" service.

When the input portion inputs an instruction to modify the proposed scenario, the control portion 111 causes the display portion 140 to display candidate scenarios corresponding to the service to which the correction instruction is input. For example, when a clerk who heard a request from a customer selects the "correction" button (performs a correction instruction) of the proposed scenario for the "withdrawal" service via the input portion, the display portion 140 displays candidate scenarios corresponding to the "withdrawal" service.

Figure 8:
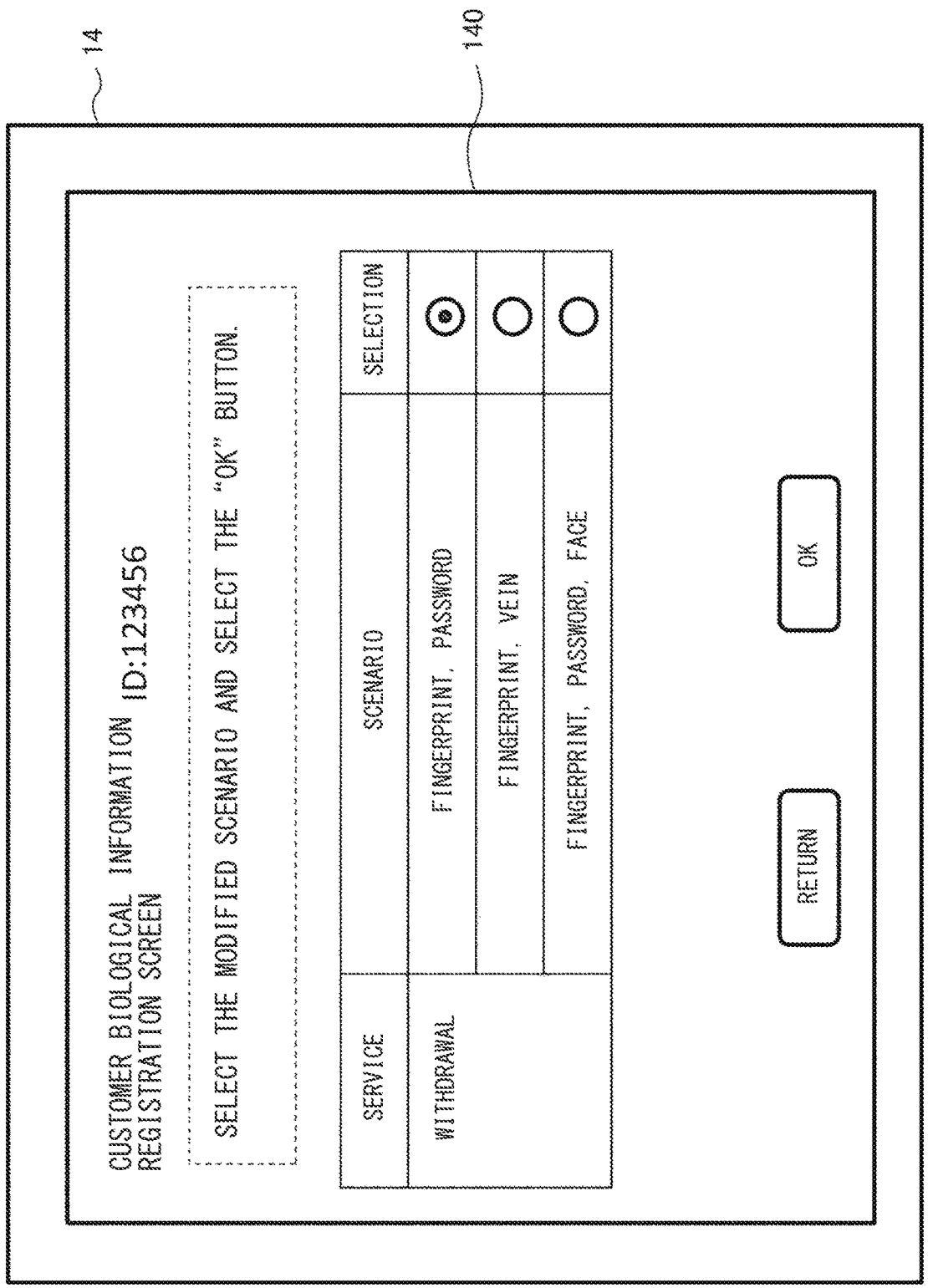
FIG. 8 is a drawing showing an example of a display by the display portion 140 in a modification of the first exemplary embodiment.

FIG. 8 shows a display example of candidate scenarios by the display portion 140 in the modification. The control portion 111 acquires candidate scenarios corresponding to the "withdrawal" service by the same operation as in the first exemplary embodiment, and causes the display portion 140 to display the acquired candidate scenarios in association with the "withdrawal" service. However, unlike the first exemplary embodiment, the control portion 111 does not need to display candidate scenarios for the "transfer" service, for which modification has not been selected. In addition, the control portion 111 need not cause the display portion 140 to display the candidate scenario consisting of the same verification scheme as the proposed scenario for which the modification instruction has been given. Since the operation of the biological data registration support 1000 after displaying the candidate scenarios is the same as that in the first exemplary embodiment, explanation thereof will be omitted.

When the input portion has input a decision instruction for a proposed scenario, the control portion 111 acquires the proposed scenario as a registration scenario. That is, the processing of S3 and S4 differs from that of the first exemplary embodiment. In the modification, the input portion in S3 selects the "OK" button input by the clerk in accordance with the customer's request (makes a determination instruction). Then, the display device 14 transmits the proposed scenario to the biological data registration support device 11 together with the corresponding service. The control portion 111 in the biological data registration support device 11 acquires the proposed scenario received by the receiving portion 110 as a registration scenario corresponding to the service transmitted together with the proposed scenario. Since the operation of the other biological data registration support system 1000 is the same as that of the first exemplary embodiment, description thereof will be omitted.

In the modification of the first exemplary embodiment, first, the proposed scenario is displayed, and when a correction instruction has been input, candidate scenarios are displayed. In other words, when the user of the biological data registration support device 11 likes the proposed scenario, it is sufficient to input the decision instruction, and when the user does not like the proposed scenario, the user can select a preferred candidate scenario from among the candidate scenarios. Therefore, the operation burden on the user is reduced, and the time required for registration of the biological data is shortened.

Second Exemplary Embodiment (Constitution of Second Exemplary Embodiment)

Figure 9:
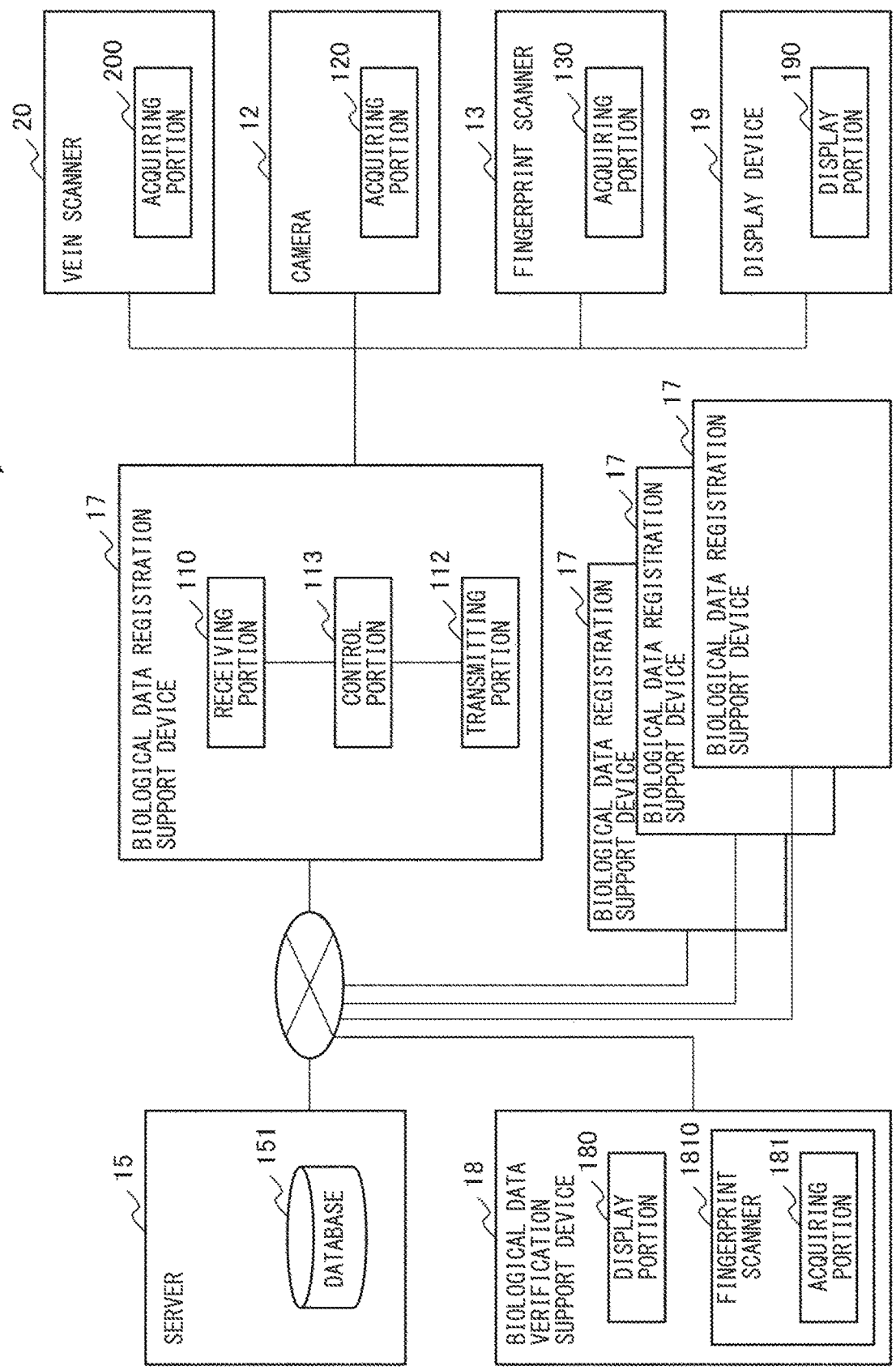
FIG. 9 is a block drawing showing a configuration example of a second exemplary embodiment.

A configuration example of a second exemplary embodiment will be described. FIG. 9 is a block drawing showing a configuration example of the biological data registration support system 1001 according to the second exemplary embodiment. The biological data registration support system 1001 differs from the first exemplary embodiment in that it includes a biological data registration support device 17, a biological data verification support device 18, a display device 19, and a vein scanner 20. In the present exemplary embodiment, portions of these constitutions different from those of the first exemplary embodiment will be described, with descriptions of other portions being omitted as appropriate.

A control portion 113 acquires candidate scenarios consisting of at least one verification method. The control portion 113 may acquire the candidate scenarios by reading the candidate scenarios stored in the storage portion. Alternatively, the control portion 113 may acquire the candidate scenarios that the receiving portion 110 has received from an external device.

Then, the control portion 113 controls the display device 19 to display the acquired candidate scenarios in the display portion 190. At this time, the control portion 113 controls the display device 19 to display the candidate scenarios and the services associated with the candidate scenarios in association with each other. Note that when the control portion 113 acquires the candidate scenarios, the candidate scenarios may be associated with services. Alternatively, after the control portion 113 has acquired the candidate scenarios, the control portion 113 may associate services with the candidate scenarios. A candidate scenario and a service being associated means that data that can specify a candidate scenario and data that can specify a service are associated with each other.

The control portion 113 acquires the candidate scenarios input by the input portion in the display device 19 as registration scenarios, and acquires the services associated with those registration scenarios. Furthermore, in addition to acquiring the registration scenarios, the control portion 113 of the present exemplary embodiment acquires backup scenarios input by the input portion in the display device 19. Similarly to a registration scenario and a candidate scenario, a backup scenario consists of at least one verification method. The backup scenario is used as a backup scenario when the registration scenario cannot be used. In addition, the backup scenario is associated with the same service as the registration scenario.

When the registration scenario and the backup scenario are associated with each other, the control portion 113 need not separately acquire the service associated with the backup scenario. On the other hand, if the registration scenario and the backup scenario do not correspond to each other, the control portion 113 separately acquires the backup scenario and the service associated with the backup scenario.

Subsequently, the control portion 113 acquires biological data for registration through the same operation as in the first exemplary embodiment. Moreover, the control portion 113 of the present exemplary embodiment acquires, from the acquiring portion 120 or the acquiring portion 130, one set of biological data regarding a verification method not included in the registration scenario, among the verification methods included in the backup scenario, as biological data for registration. That is, when there is a verification method among the verification methods included in a backup scenario that is not included in the registration scenario, the control portion 113 controls the acquiring portion 120 or 130 to acquire the biological data regarding that verification method. On the other hand, when all of the verification methods included in the backup scenario are included in the acquired registration scenario, the control portion 113 does not need to separately acquire biological data regarding the backup scenario.

The control portion 113 specifies a common verification method commonly included in a plurality of backup scenarios. When the common verification method is not included in the registration scenario, the control portion 113 acquires one set of biological data regarding the common verification method from the acquiring portion 120 or 130 as biological data for registration. Furthermore, when a verification method other than the common verification method included in the backup scenarios is not included in the registration scenario, one set of biological data regarding the verification method is acquired from the acquiring portion 120 or 130 as biological data for registration.

Then, the control portion 113 causes the transmitting portion 112 to transmit the biological data for registration that has been acquired, the plurality of registration scenarios, the services associated with the registration scenarios, and the backup scenarios.

Note that the control portion 113 may specify a verification method that is commonly included in the registration scenarios and the backup scenarios as a common verification method. Then, one set of biological data regarding the common verification method and one set of biological data regarding a verification method other than the common verification may be acquired from the acquiring portions 120 or 130.

The display portion 190 in the display device 19 displays the candidate scenarios acquired from the control portion 113 in association with services. Then, the input portion in the display device 19 inputs the candidate scenarios selected by the clerk out of the candidate scenarios displayed by the display portion 190. Furthermore, the input portion of the present exemplary embodiment inputs the scenarios selected by the clerk as backup scenarios among the candidate scenarios. Then, the transmitting portion in the display device 19 acquires the candidate scenarios and the backup scenarios selected by the clerk from the input portion, and together with the services corresponding to the candidate scenarios and the backup scenarios, transmits the candidate scenarios and the backup scenarios to the biological data registration support device 17.

The transmitting portion 112 transmits the biological data for registration acquired by the control portion 113, the plurality of registration scenarios, the backup scenarios, and the services associated with the registration scenarios and the backup scenarios to the server 15.

The customer database 151 in the server 15 stores the biological data for registration received by the receiving portion, the registration scenarios, the backup scenarios, and the services stored in association with each other. An example of data stored in the customer database 151 is shown in FIG. 10. The data shown in FIG. 10 differs from the data in the customer database 151 shown in FIG. 3 in that a backup scenario is associated with each service received by the customer with the ID number 123456.

In FIG. 10, in addition to the data shown in FIG. 3, a backup scenario consisting of the vein verification method and a password verification method is associated with the "withdrawal" service of the customer with ID 123456. Furthermore, a backup scenario consisting of the vein verification method, the password verification method, and the face verification method is associated with the service of "transfer". In addition, vein image data is further associated with ID 123456 as biological information of the customer. Note that a backup scenario may be associated with only some services. Registration scenarios and backup scenarios may be associated with all ID numbers.

<Verification of Biological Data>

A configuration relating to verification of biological data in the biological data registration system 1001 will be described with respect to portions that differ from the first exemplary embodiment. Descriptions of portions similar to those of the first exemplary embodiment will be omitted as appropriate.

The server 15 searches the database 150 and transmits the registration scenario, the backup scenario, and the biological data for registration associated with the received ID number and the received service to the biological data verification support device 18. If a backup scenario associated with the received ID number and the received service does not exist in the database 150, the server 15 need not transmit a backup scenario. Further, the server 15 may transmit the password associated with the ID number. The password may be stored in the database 150 together with the fingerprint image data or the like, or may be stored in another database.

The biological data verification support device 18 performs a display for acquiring from the customer biological data regarding the verification method included in the registration scenario received from the server 15. That is, the control portion in the biological data verification support device 18 controls the display portion 180 so as to perform a display prompting the customer to provide biological data. Here, when the customer wants to change the verification method, that is, wants to change the registration scenario, the display portion 180 of the present exemplary embodiment performs a display for performing verification using the backup scenario instead of the registration scenario.

For example, the display portion 180 displays a "change" icon together with a display prompting the customer to provide biological data. When the customer selects "change" via the input portion, the control portion controls the display portion 180 so as to perform a display prompting the provision of biological data regarding the verification method included in the backup scenario. Then, the control portion controls the acquiring portion 181 in the biological data verification support device 18 to acquire biological data regarding the verification method included in the backup scenario. The control portion 181 acquires the biological data from the acquiring portion 181 and performs verification with the biological data for registration transmitted from the server 15. In FIG. 9, a fingerprint scanner 1810 is denoted as an example of the acquiring portion 181, similarly to the first exemplary embodiment.

When the customer does not select "change" via the input portion and provides the biological data regarding the verification method included in the registration scenario, the control portion 180 need not acquire biological data regarding the verification method included in the backup scenario. In this case, the biological data verification support device 18 performs the same processing as in the first exemplary embodiment.

(Operation of Second Exemplary Embodiment)

<Registration of Biological Data>

Figure 11:
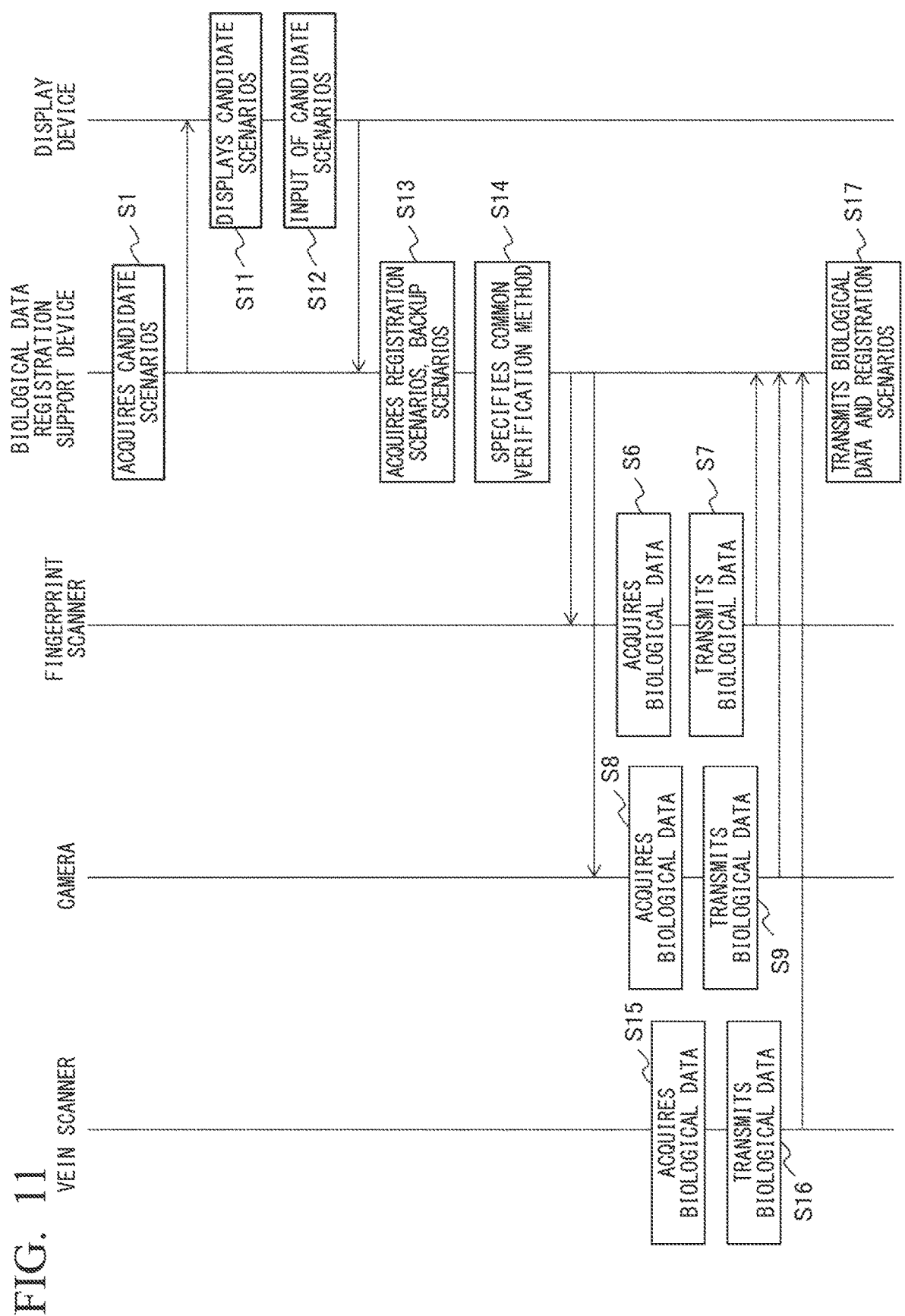
FIG. 11 is a sequence diagram showing an example of the operation of the second exemplary embodiment.

FIG. 11 is a sequence diagram showing an example of operations related to biological data registration according to the second exemplary embodiment. Also in the present exemplary embodiment, as in the first exemplary embodiment, a situation is assumed in which a customer of a bank goes up to a window and registers biological data via a clerk. Explanation of operations similar to those in the first exemplary embodiment will be omitted.

The control portion 113 causes the display portion 190 to display the acquired candidate scenarios in association with the services (S11). At this time, the control portion 113 causes the display portion 190 to perform display such that registration of backup scenarios is possible. A backup scenario is a scenario that a customer can use instead of the registration scenario. An example of display by the display portion 190 is shown in FIG. 12. FIG. 12 shows a display example in which it is possible to select registration scenarios and backup scenarios in the same screen, along with the guide text "Please select the scenario to be used for personal authentication necessary to receive each service. Please select a backup scenario as necessary."

Here, it will be assumed that the customer requests the clerk to register a backup scenario in case a fingerprint image cannot be imaged clearly due to the fingertip being chapped. While listening to the preferences of the customer, the clerk then selects the candidate scenario to be selected as the registration scenario and the backup scenario to be registered as the backup scenario via the input portion included in the display device 19 (S12).

Then, the control portion 113 acquires the registration scenarios and the backup scenarios input by the input portion, and the services associated therewith (S13). For example, if the registration scenarios and the backup scenarios are selected as shown in FIG. 12, the control portion 113 acquires the registration scenario consisting of the fingerprint verification method and the password verification method, and the backup scenario consisting of the vein verification method and the password verification method corresponding to the "withdrawal" service. The control portion 113 also acquires the registration scenario consisting of the fingerprint verification method, the password verification method, and the face verification method, and the backup scenario consisting of the vein verification method, the password verification method, and the face verification method corresponding to the "transfer" service.

Thereafter, the control portion 113 specifies, as a common verification method, the verification method commonly included in the two registration scenarios and the two backup scenarios that have been acquired (S14). For example, as verification methods common among at least two scenarios among the four scenarios acquired in association with the services of "withdrawal" and "transfer", the control portion 113 specifies three of the fingerprint verification method, the vein verification method, the face verification, and the password verification method as common verification methods.

The control portion 113 causes the acquiring portion 120 and the acquiring portion 130 to acquire biological data regarding each common verification method. Also, the control portion 113 acquires biological data regarding each verification method other than the common verification methods out of the verification methods included in the four scenarios. In the example of the present exemplary embodiment, since there is no verification method other than the common verification methods, the control portion 113 does not need to acquire biological data regarding a verification method other than the common verification methods.

In the present exemplary embodiment, vein image data is acquired in addition to the fingerprint image data and the face image data acquired in the example of the first exemplary embodiment. The control portion 113 controls the vein scanner 2000 to acquire the vein image data. Specifically, the vein scanner 200 is activated upon receiving a signal from the control portion 113. In the vein scanner 200, after the customer places his finger on or holds his finger over the vein scanner 200, the vein scanner 200 captures an image of the vein pattern of the customer and generates/acquires the vein image data (S15). The acquisition of fingerprint image data and face image data is the same as in the first exemplary embodiment. Although the password authentication method is also a common verification method, biological data regarding the password verification method need not be acquired because biological data is not used in the password authentication method.

The biological data acquired by the acquiring portion 120, the acquiring portion 130, and the acquiring portion 200 is transmitted to the biological data registration support device 17 by the transmitting portion (S7, S9, S16). Then, the control portion 113 acquires one set of biological data regarding each common verification method as biological data for registration. Note that while the control portion 113 sequentially acquires a plurality of sets of biological data from each of the acquiring portions 120, 130, and 200, the control portion 113 may delete biological data from the storage portion or synthesize two or more sets of biological data so that one set of biological data is acquired regarding one verification method.

The control portion 113 causes the transmitting portion 112 to transmit the acquired biological data for registration, the plurality of registration scenarios, the services associated with the registration scenarios, and the backup scenarios. The transmitting portion 112 transmits these sets of information to the server 15 (S17). At this time, the control portion 113 may cause the transmitting portion 112 to transmit information for identifying the customer, for example, an ID number.

The server 15 stores the biological data for registration, the registration scenarios, the backup scenarios, and the services in association with each other in the customer database 15. The server 15 may store the customer's ID number in association with these sets of information. By the above operation, registration of the biological data of the customer is completed.

<Verification of Biological Data>

Figure 13:
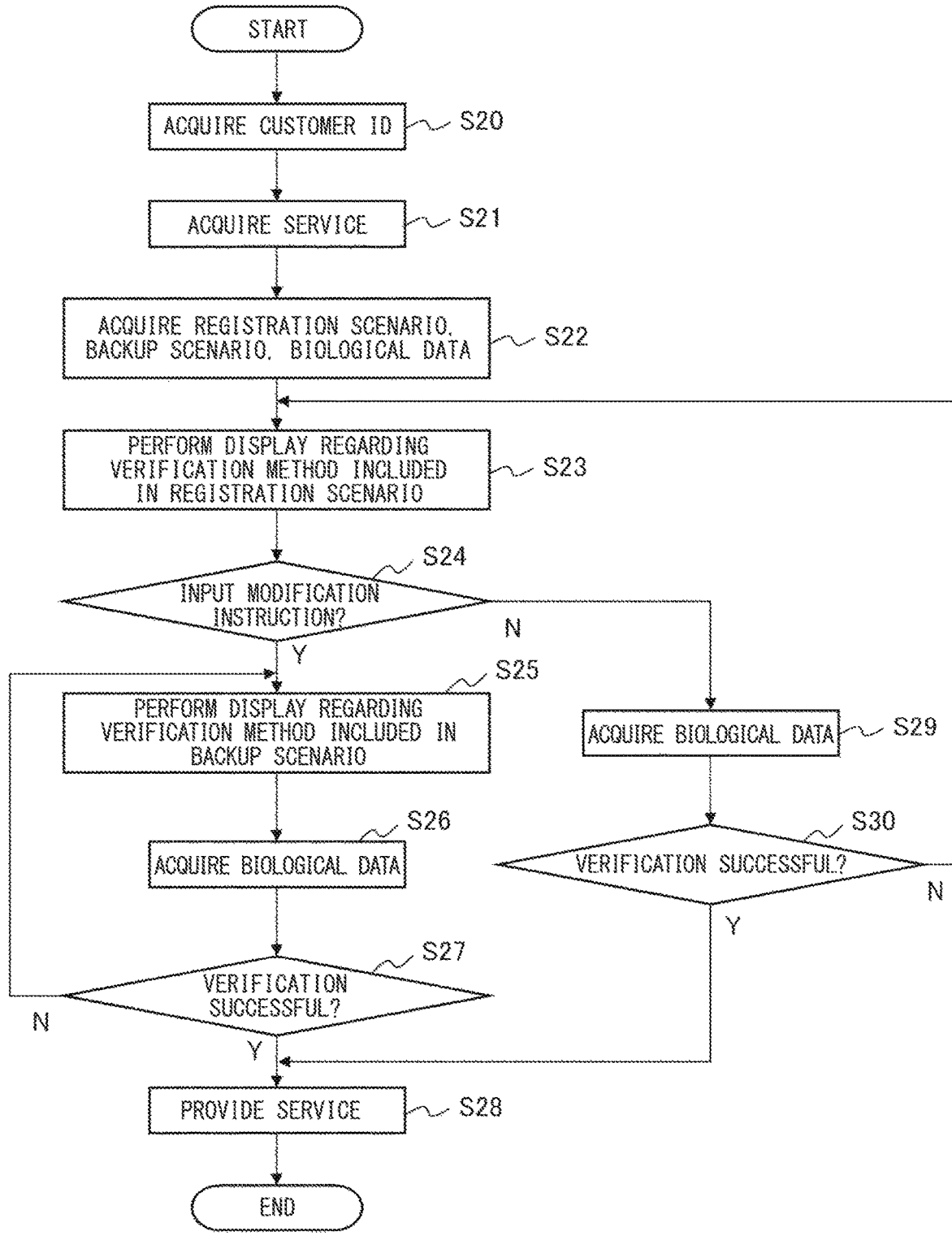
FIG. 13 is a flowchart showing an example of the operation of the second exemplary embodiment.

FIG. 13 is a flowchart showing an example of an operation related to verification of biological data according to the second exemplary embodiment.

When the customer inserts a cash card or bank passbook into the biological data verification support device 18, the control portion in the biological data verification support device 18 reads the cash card or passbook and acquires the customer's ID number (S20). Note that the control portion may recognize the account number, the customer's name, etc. in place of the ID number or along with the ID number. Then, the control section causes the display section 180 to display a list of services provided by the biological data verification support device 18. When the customer selects a service via the input portion, the control portion acquires the service selected by the customer (S21). The control portion transmits the ID number and the selected service to the server 15 via the transmitting portion.

The server 15 searches the database 150 and transmits the registration scenario, the backup scenario, and the biological data for registration associated with the received ID number and the received service to the biological data verification support device 18. Then, the control portion in the biological data verification support device 18 acquires the registration scenario, the backup scenario, and the biological data received by the receiving portion (S22).

The control portion in the biological data verification support device 18 performs a display via the display portion 180 prompting the provision of biological data regarding the verification method included in the registration scenario (S23). In the case of the registration scenario including a verification method that does not use biological data, for example, the password verification method, the control portion may perform a display via the display portion 180 prompting the input of information other than biological data.

Here, if the customer wishes to change the registration scenario for some reason, it is assumed that the customer inputs an instruction to modify the registration scenario via the input portion (S24). When the input portion inputs the correction instruction, the control portion performs a display via the display portion 180 for acquiring from the customer biological data regarding the verification method included in the backup scenario (S25). Further, when the backup scenario includes a verification method that does not use biological data such as the password verification method, the control portion may perform a display via the display portion 180 prompting the input of information other than biological data.

On the basis of control by the control portion, the acquiring portion 181 acquires from the customer biological data regarding the verification method included in the backup scenario (S26). Then, the control portion collates the biological data acquired from the acquiring portion 181 and the biological data for registration acquired from the server 15 (S27). When a verification method that does not use biological data, such as the password verification method, is included in the backup scenario, the control portion collates the password input by the customer via the input portion with the password acquired from the server 15. The control portion provides the service acquired from the server 15 to the customer (S28) when the collation of the biological data and the information other than the biological data regarding all the verification methods included in the backup scenario is successful. If there is a verification method for which collation has failed, the control portion displays a message prompting the input of biological data again via the display portion 180.

In S24, if no correction instruction is input, the acquiring portion 181, based on control of the control portion, acquires from the customer biological data regarding the verification method included in the registration scenario (S29). Then, the control portion collates the biological data acquired from the acquiring portion 181 and the biological data for registration acquired from the server 15 (S30). The control portion provides the service acquired from the server 15 to the customer (S28) when the collation of the biological data and the information other than the biological data regarding all the verification methods included in the registration scenario is successful. If there is a verification method for which collation has failed, the control portion displays a message prompting the input of biological data again via the display portion 180.

In the second exemplary embodiment, it is possible to prepare a backup scenario that becomes a backup of the registration scenario, and acquire/verify biological data regarding the verification method included in the backup scenario. In addition, when registering biological data, the customer can select any backup scenario. As a result, even if the state of the customer's body changes from that at the time of registration and becomes unsuitable for acquiring specific biological data, the customer can select a different verification method, so that it is possible to receive a service promptly.

Note that the biological data registration support device 17 need not acquire and display candidate scenarios. The control portion 113 in the biological data registration support device 17 may read and acquire registration scenarios and backup scenarios stored in the storage portion and may transmit the registration scenarios and the backup scenarios to the server 15 via the transmitting portion 112.

In addition, the backup scenario preferably includes an authentication method not included in the registration scenario. A backup scenario may also be defined uniformly for each service, such that the customer is not allowed to make a selection. Also, the backup scenario may be settable only for customers who so desire, or may be settable for all customers.

The server 15 may transmit the backup scenario to the biological data verification support device 18 after a change instruction regarding the registration scenario is input to the biological data verification support device 18. That is, the server 15 may transmit the registration scenario and the backup scenario to the biological data verification device 18 at different times.

Third Exemplary Embodiment

A third exemplary embodiment will be described. The block diagram showing the configuration example of the third exemplary embodiment is the same as that of FIG. 2 or 9, but the operation of the server 15 is different from that of the first exemplary embodiment and the second exemplary embodiment. In the present exemplary embodiment, functions of the server 15 different from those of the first exemplary embodiment and the second exemplary embodiment will be mainly described, with descriptions of other configurations being omitted as appropriate.

First, when an application for biological data registration is activated, the control portion 111 in the biological data registration support device 11 acquires one or more verification methods. The control portion 111 may acquire the verification method from the storage portion in the biological data registration support device 11. Alternatively, the control portion 111 may acquire the verification method received by the receiving portion from an external device. Then, the control portion 111 transmits the acquired verification method to the display device 14 via the transmitting portion 112, and causes the display portion 140 to display the verification method.

The user who sees the display of the display portion 140 selects one or a plurality of verification methods displayed in the display portion 140 via the input portion. Then, the control portion 111 transmits the plurality of verification methods acquired from the input portion to the server 15 via the transmitting portion 112.

The control portion in the server 15 selects one or a plurality of the verification methods received by the receiving portion and generates a scenario. The control portion may randomly select the acquired verification methods to generate the scenario. Then, the control portion in the server 15 transmits the generated scenario to the biological data registration support device 1000 via the transmitting portion.

The control portion 111 in the biological data registration support device 1000 acquires the scenario received by the receiving portion 110 from the server 15 as a registration scenario. Alternatively, the control portion 111 may acquire the scenario acquired from the server 15 as a candidate scenario or a proposed scenario. In this case, the control portion 111 displays the scenario acquired from the server 15 as a candidate scenario or a proposed scenario via the display portion 140. Then, when the user selects the candidate scenario or the proposed scenario, the control portion 111 may acquire the selected candidate scenario or proposed scenario as the registration scenario. Since the operation of the control portion 111 after acquiring the registration scenario is the same as that of the first exemplary embodiment and the second exemplary embodiment, description thereof will be omitted.

The biological data registration support device 1000 according to the present exemplary embodiment can generate a scenario from a verification method selected by a user to make a registration scenario, a candidate scenario, or a proposed scenario. Therefore, the user can select a verification method that takes into consideration the characteristics of the user's own body in advance or a verification method toward which the user is less prone to feel resistance. Therefore, in the present exemplary embodiment, it is possible to realize verification of biological data more according to the user's request.

Figure 14:
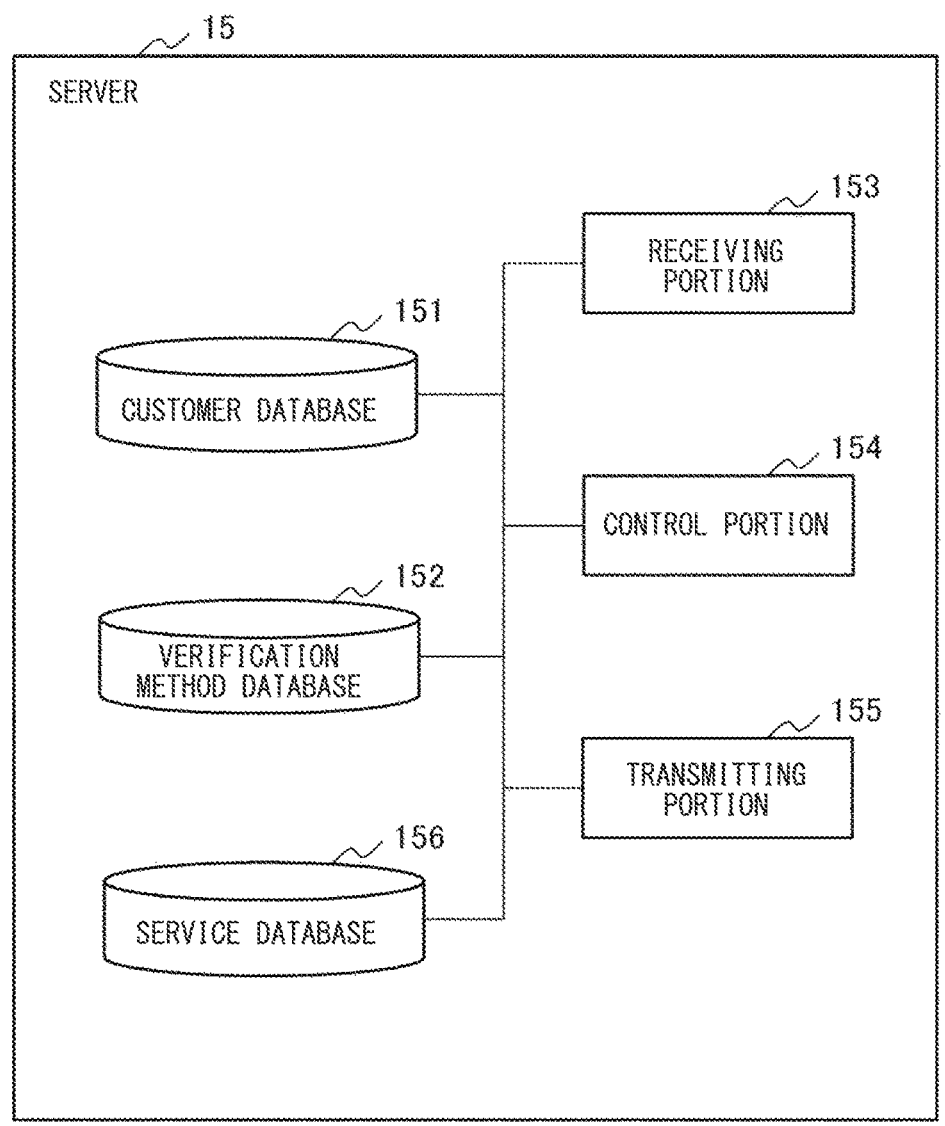
FIG. 14 is a block drawing showing a configuration example of the server 15 in a third exemplary embodiment.

A specific example of scenario generation by the server 15 is described hereinbelow. FIG. 14 is a diagram showing a configuration example of the server 15. The server 15 includes a customer database 151, a verification method database 152, a receiving portion 153, a control portion 154, and a transmitting portion 155. Here, in order to be distinguished from the verification method database 152, for convenience the database in the server 15 is referred to as the customer database 151.

The receiving portion 153 receives one or a plurality of verification methods from the biological data registration support device 11. The verification method received by the receiving portion 153 may be a verification method selected by the user of the biological data registration support terminal 11.

The control portion 154 acquires one or a plurality of verification methods received by the receiving portion 153. Then, the control portion 154 refers to the verification method database and acquires the security value associated with the acquired verification method. The security value is a value indicating the level of security of the verification method, and is stored in the verification method database in association with each verification method. The level of security indicates the degree to which the verification will fail for an attacker attempting to receive a service by impersonating a customer. In other words, when the security value is high, verification with regard to biological data of the attacker is apt to fail, and when the security value is low, it is easy for the verification of biological data of the attacker to succeed. For example, the security value may be regarded as the probability that verification of an attacker is successful.

The control portion 154 calculates a scenario security value indicating the security level of a scenario on the basis of the security value acquired for a verification method. The scenario may be one generated by the control portion 154 randomly from one or more verification methods. Alternatively, the control portion 154 may create a scenario for all cases in which one or a plurality of collation methods are selected from the acquired one or a plurality of collation methods to calculate a scenario security value.

For example, the control portion 154 may calculate the scenario security value by multiplying or adding the security value associated with the verification method that constitutes the scenario. In the case where there is only one verification method constituting the scenario, the security value of the verification method may be set as the scenario security value.

For example, assume that a scenario consists of the fingerprint verification method and the vein verification method. Also assume that the security value of the fingerprint verification method is p and the security value of the vein verification method is q. In this case, the control portion 154 calculates the scenario security value of the scenario as p×q.

Moreover, when the calculated scenario security value satisfies a predetermined condition for a service, the control portion 154 causes the transmitting portion 155 to transmit the scenario in association with the service. The predetermined condition may be that the scenario security value is greater than a threshold value defined for the service. That is, when the scenario security value exceeds the threshold for a certain service, the control portion 154 may transmit the scenario in association with the service. In other words, the scenario may be transmitted in association with the service when the scenario satisfies the level of security required to provide the service.

The control portion 154 reads a predetermined condition from the service database 156. Then, the control portion 154 determines whether or not the calculated scenario security value satisfies the predetermined condition that has been read. For example, the control portion 154 may read predetermined conditions for all the services stored in the service database 156 and determine whether all the generated scenario security values satisfy the predetermined conditions on a round-robin basis. Alternatively, the control portion 154 may read from the service database 156 a predetermined condition for a specific service acquired in advance and compare the condition with the generated scenario security value.

The verification method database 152 stores a security value in association with each verification method. FIG. 15 shows an example of data stored in the collation method database 152. From FIG. 15, the security values associated with the fingerprint verification method, the vein verification method, the face verification method, and the password verification method are P, Q, R, and S, respectively. The security value may be a value determined or updated based on past experience, a popular attack, a prediction of increase in attacks, etc. For example, when an elaborate fingerprint film using silicone turns up, the security value associated with the fingerprint verification method may be updated to a small value.

The service database 156 stores a predetermined condition in association with each service. For example, the predetermined condition may determine by the relationship between the scenario security value and the threshold value whether or not a certain scenario is associated with a certain service. FIG. 16 shows an example of data stored in the service database 156. From FIG. 16, the predetermined conditions associated with transfer and withdrawal are scenario security value >p and scenario security value >q, respectively. Also, the predetermined conditions associated with deposit and balance inquiry are scenario security value >r and scenario security value >s, respectively. That is, the thresholds as to whether or not a certain scenario is to be associated with each service shown in FIG. 16 are p, q, r, s.

For example, if an attacker who impersonates a user receives a service such as "transfer" or "withdrawal" at a bank, money may be withdrawn from the bank account of the user, causing a great loss. On the other hand, even if an attacker receives services such as "deposit" or "balance inquiry", the chance is small of a serious loss immediately occurring. Therefore, for services such as "transfer" and "withdrawal", it is desirable that a threshold that is higher than the threshold of services such as "deposit" or "balance inquiry" be set.

Under the control of the control portion 154, the transmitting portion 155 transmits a scenario satisfying a predetermined condition of a service to the biological data registration support device 1000 in association with the service.

In this specific example, when the security value for a scenario satisfies the condition defined for a service, the biological data registration support device acquires the scenario associated with the service. Accordingly, since the user of the biological data registration support system can register biological data regarding a scenario having sufficient security with respect to a service received by the user, the safety of service provision is enhanced.

(Hardware Constitution)

Hereinbelow, the hardware constitutions of the first exemplary embodiment to the third exemplary embodiment will be described.

Figure 17:
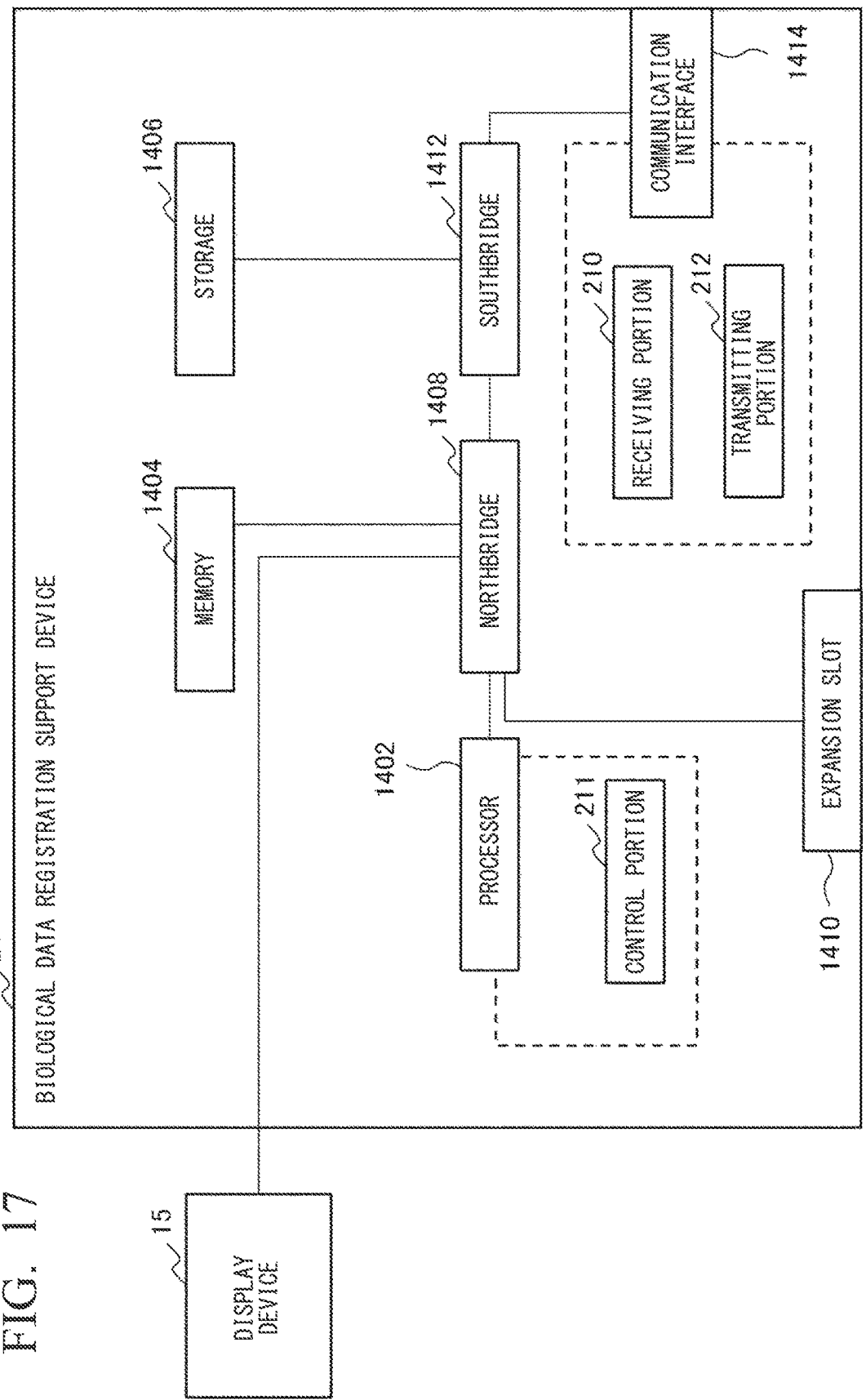
FIG. 17 is a block drawing showing a first example of the hardware configuration of the biological data registration support device in each exemplary embodiment.

FIG. 17 is a block diagram showing a first example of the hardware configuration of the above-described biological data registration support devices 10, 11 and 17. Hereinafter, a first example of this hardware configuration will be referred to as a biological data registration support device 21. The biological data registration support device 21 may be any general computer. For example, the biological data registration support device 21 may be a notebook PC, a desktop PC, a server, a workstation, a blade server, or the like. In addition, the biological data registration support device 21 may be connected in a communicable manner to a server, another computer, or the like.

From FIG. 17, the biological data registration support device 21 includes a processor 1402, a memory 1404, a storage 1406, a northbridge 1408 connected to the memory 1404, and an expansion slot 1410. Further, the biological data registration support device 21 further includes a communication interface 1414 and a southbridge 1412 connected to the storage 1406. These constituent elements are connected to each other by a bus and affixed to a motherboard.

The processor 1402 reads and executes instructions stored in the memory 1404, the storage 1406, and the like. The processor 1402 may execute instructions to display images in the display device 14. The control portion 211 may be realized by the processor 1402. That is, the processor 1402 realizes the operation of the control portion 211 by reading out programs stored in the memory 1404 and the storage 1406. The processor 1402 may be a circuit such as a CPU (Central Processing Unit), ASICs (Application Specific Integrated Circuits), or the like.

The memory 1404 is a computer readable storage medium that stores information. The memory 1404 may be a volatile storage medium such as a RAM or a nonvolatile storage medium such as a ROM. Further, the memory 1404 may be an optical disk, a magnetic disk, or the like. The storage 1406 may be a large-capacity computer readable storage medium. The storage 1406 may be, for example, a floppy (registered trademark) disk, a hard disk drive, an optical disk, a flash memory, or the like. The above exemplary embodiment is realized by the execution of an instruction included in a computer program stored in a computer-readable storage medium realizes.

The northbridge 1408 connects the parts regarded as the brains of the computer, such as the CPU and memory, and controls the timing and speed of data transfer. The northbridge 1408 handles data transfer between devices that operate primarily at high speed. On the other hand, the southbridge 1412 handles data transfer with relatively low-speed devices. For example, the northbridge 1408 may be connected to a memory 1404, a display device 14, and an expansion slot 1410 that can accept expansion cards. Also, the southbridge 1412 may be connected to the storage 1406 and the communication interface 1414.

The communication interface 1414 may include various communication ports such as USB, Bluetooth (registered trademark), Ethernet (registered trademark), wireless Ethernet, and the like. Further, these communication ports may be connected to one or more input/output devices, for example, communication devices such as a keyboard, a pointing device, a scanner, a wireless LAN (Local Area Network) adapter, a router, and the like. Further, the communication interface 1414 may include a wireless LAN adapter. The communication interface 1414 may realize functions of the receiving portion 210 and the transmitting portion 212.

Figure 18:
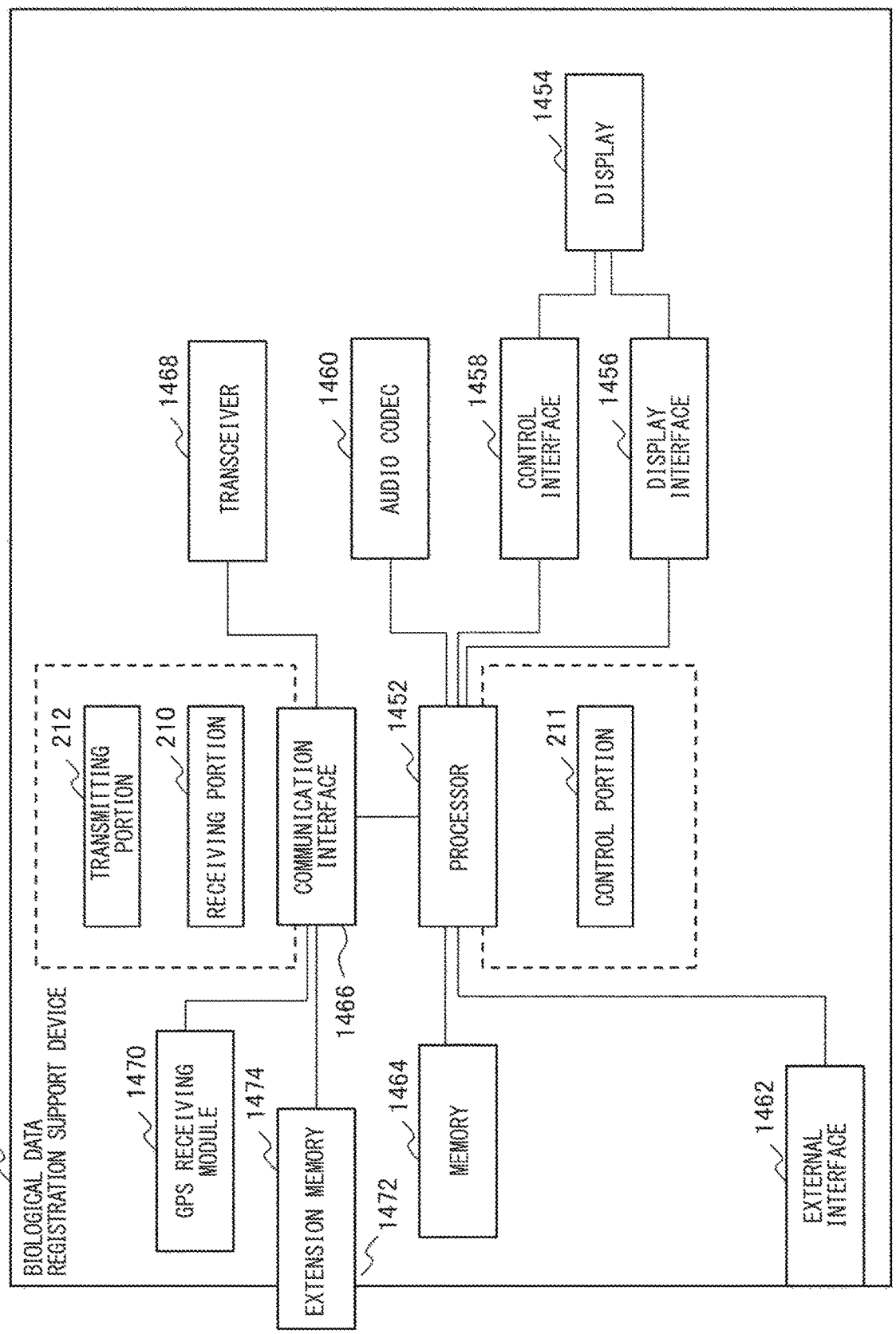
FIG. 18 is a block drawing showing a second example of the hardware configuration of the biological data registration support device in each exemplary embodiment.

FIG. 18 is a block diagram showing a second example of the hardware configuration of the biological data registration support devices 10, 11 and 17. Hereinafter, a second example of this hardware configuration will be referred to as a biological data registration support device 22. The biological data registration support device 22 may be a mobile terminal such as a mobile phone, a smartphone, a PDA (personal digital assistant), or the like.

The biological data registration support device 22 may have a display 1454, a transceiver 1468, an audio codec 1460, a control interface 1458, and a display interface 1456. Further, the biological data registration support device 22 may further include a communication interface 1466, a processor 1452, a GPS (Global Positioning System) receiving module 1470, an extension memory 1474, a memory 1464, and an external interface 1462.

The display 1454 may, for example, be a TFT LCD (Thin-Film Transistor Liquid Crystal Display), an OLED (Organic Light Emitting Diode) display, or another display. Further, the display may be connected to the control interface 1458 and the display interface 1456. The processor 1452 may exchange information with the user of the biological data registration support device 22 via the control interface 1458 and the display interface 1456.

The display interface 1456 may be constituted by a circuit. The display interface 1456 controls the display in order to display images and other information to the user. The control interface 1458 receives commands from the user. The control interface 1458 may then convert the received commands for handover to the processor 1452.

In addition, the biological data support device 22 may have an external interface 1462 that enables communication with the processor 1402. The external interface 1462 enables communication between a peripheral device of the biological data support device 22 and the biological data support device 22. The external interface 1462 may provide wired communication or wireless communication.

The extension memory 1474 may be connected to the biological data registration support device 22 via an extension interface 1472. Further, the extension memory 1474 may include a SIMM (Single Inline Memory Module) card interface, for example. Further, the extension memory 1474 may provide an additional storage area to the biological data registration support device 22, and may store the application and other information. Further, the extension memory 1474 may store information related to security. That is, the extension memory 1474 may function as a security management device of the biological data registration support device 22. For example, an instruction for realizing safe use of the biological data registration supporting device 22 may be programmed in the extension memory 1474.

The biological data registration support device 22 performs wireless communication via the communication interface 1466. The communication interface 1466 may include a digital signal processing circuit. The communication interface 1466 may realize communication under modes and protocols such as Global System for Mobile Communication (GMS), Short Message Service (SMS), Enhanced Messaging Service (EMS) and the like. Alternatively, the communication interface 1466 may realize communication under modes and protocols such as MMS (Multimedia Messaging Service), CDMA (Code Division Multiple Access), TDMA (time division multiple access) and the like.

Moreover, the communication interface 1466 may implements communication under modes and protocols such as PDC (Personal Digital Cellular), WCDMA (registered trademark) (Wideband Code Division Multiple Access), CDMA 2000, GPRS (General packet radio service). The aforementioned communication occurs, for example, via the transceiver 1468. Communication using narrow range communication, for example, Bluetooth, Wi-Fi (registered trademark), or the like may also be generated via the transceiver 1468. The communication interface 1466 may realize the transmitting portion 212 and the receiving portion 210.

The GPS receiving module 1470 may provide data used by an application operating in the biological data registration support device 22. The data may be, for example, data related to position or navigation.

In addition, the biological data registration support device 22 may perform voice communication via the audio codec 1460. The audio codec 1460 acquires voice information from the user and converts the voice information into a form that can be used as digital information. In addition, the audio codec 1460 generates speech that can be heard by the user. The information handled by the audio codec 1460 may be a voice call, a recorded sound (a voice message, music file, or the like), a sound generated by an application on the biological data registration support device 22, or the like.

Since the processor 1452 and the memory 1464 are the same as the biological data registration supporting device 22, their explanation is omitted. The processor 1452 may realize the control portion 211. Further, the receiving portion 210 and the transmitting portion 212 may be realized by the external interface 1462.

Figure 19:
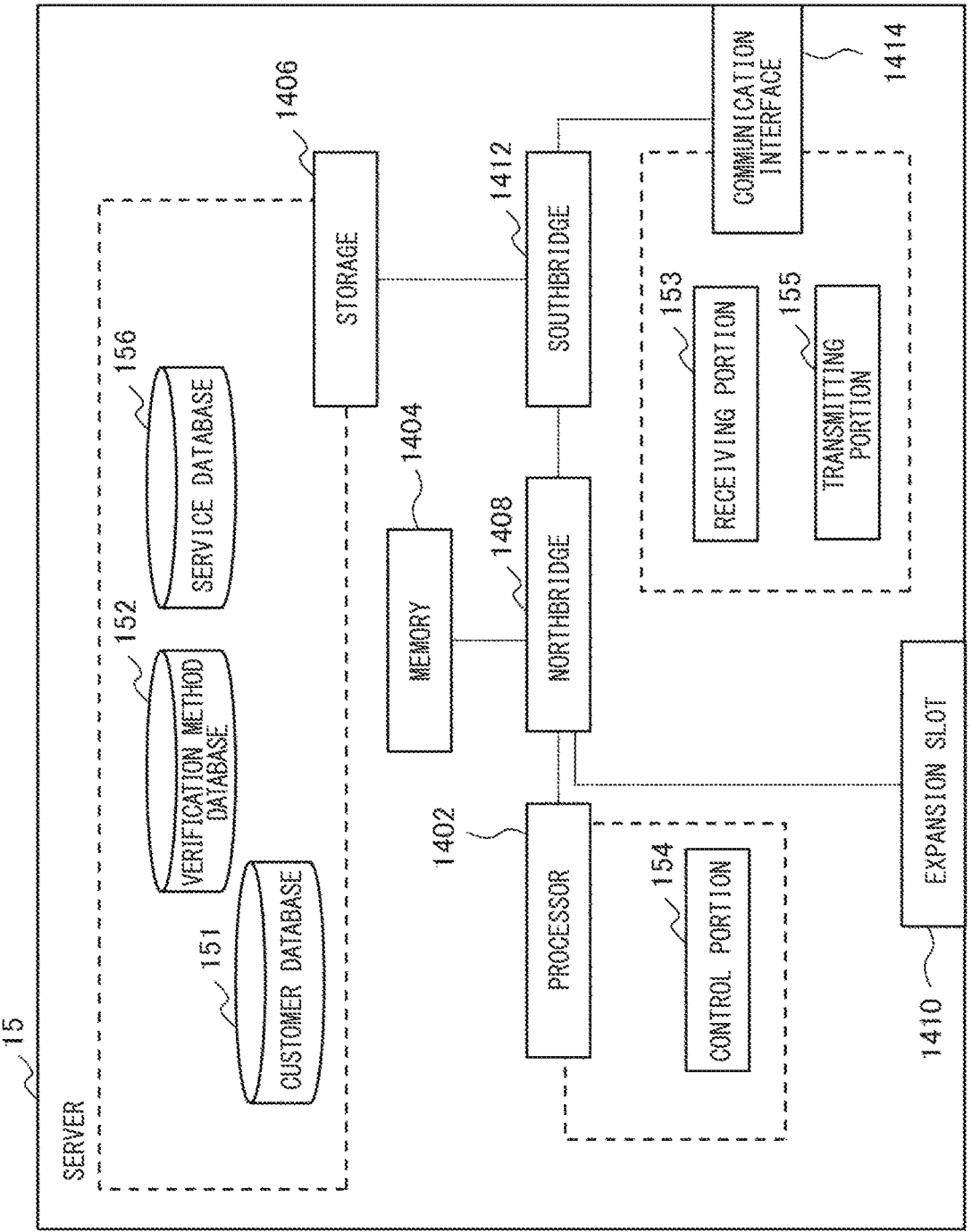
FIG. 19 is a block drawing showing an example of the hardware configuration of the server in each exemplary embodiment.

FIG. 19 shows an example of the hardware configuration of the server 15 described above. The server 15 may be any common computer. For example, the server 15 may be a notebook PC, a desktop PC, a server, a workstation, a blade server, or the like. In addition, the server 15 may be connected in a communicable manner to another server, another computer, or the like.

From FIG. 19, the server 15 includes a processor 1402, a memory 1404, a storage 1406, a northbridge 1408 connected to the memory 1404, and an expansion slot 1410. Further, the server 15 further includes a communication interface 1414 and a southbridge 1412 connected to the storage 1406. These components are connected to each other by a bus and affixed to the motherboard. Since the above hardware configuration is the same as that of the biological data registration support device 22, explanation thereof will be omitted.

It should be noted that the receiving portion 153 and the transmitting portion 155 may be realized by the communication interface 1414. In addition, the customer database 151, the verification method database 152, and the service database 156 may be realized by the storage 1406.

Figure 20:
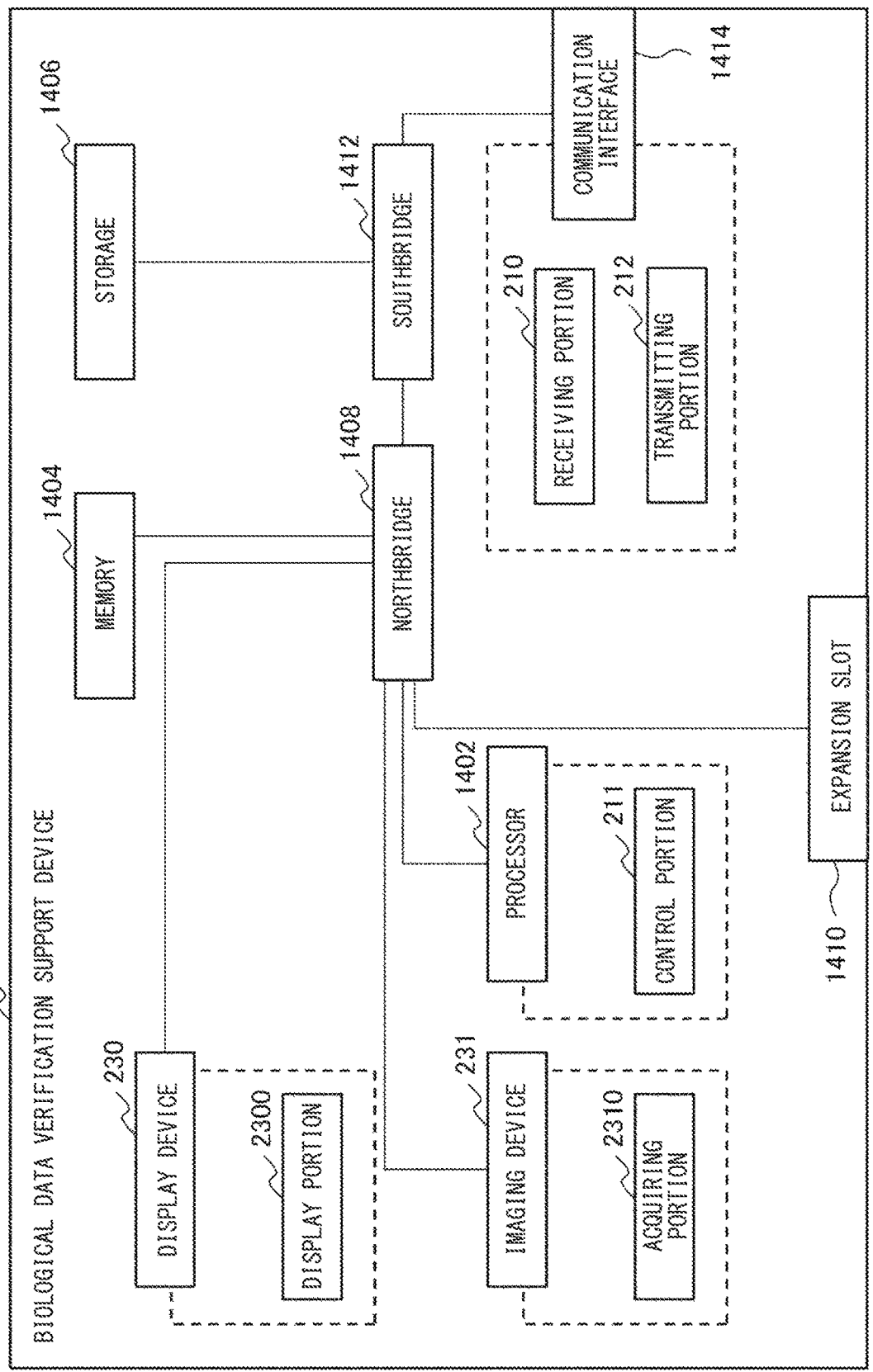
FIG. 20 is a drawing showing an example of the hardware configuration of the biological data verification support device in each exemplary embodiment.

FIG. 20 is a block diagram showing an example of the hardware configuration of the biological data verification support devices 16 and 18 described above. Hereinafter, this hardware configuration will be referred to as biological data verification support device 23. The biological data verification support device 23 may be any general computer. For example, the biological data verification support device 23 may be a notebook PC, a desktop PC, a server, a workstation, a blade server, or the like. In addition, the biological data verification support device 23 may be connected in a communicable manner to the server, another computer, or the like.

From FIG. 20, the biological data verification support device 23 includes a processor 1402, a memory 1404, a storage 1406, a northbridge 1408 connected to the memory 1404, and an expansion slot 1410. Further, the biological data verification support device 23 further includes a communication interface 1414, a southbridge 1412 connected to the storage 1406, and an imaging device 231. These components are connected to each other by a bus and affixed to the motherboard.

The imaging device 231 includes, for example, a CCD (Charge Coupled Device) sensor, a CMOS (Complementary Meta Oxide Semiconductor) sensor, an image processor, and the like. The imaging device 231 converts light from the subject received by the CCD sensor or the CMOS sensor, and generates image data. The subject may be part of a living body such as a face, a fingerprint, a vein pattern, an iris, or the entire body. The imaging device 231 may have a structure suitable for imaging each subject. Further, the imaging device 231 may have a light source for illuminating the body, a placing portion for placing the body, and the like.

Since the hardware configuration other than the imaging device 231 is the same as that of the biological data registration support device 22, explanation thereof will be omitted. Note that the display unit 2300 may be realized by the display device 230. In addition, the acquiring portion 2310 may be realized by the imaging device 231. The control portion 211 may be realized by the processor 1402. The receiving portion 210 and the transmitting portion 212 may be realized by the communication interface 1414.

The above-described exemplary embodiments are merely examples of embodying the present invention, and various modifications can be made within the scope of the gist of the present invention recited in the claims.

Priority is claimed on Japanese Patent Application No. 2016-69991, filed on Mar. 31, 2016, the content of which is incorporated herein by reference.

DESCRIPTION OF REFERENCE SYMBOLS

10: Biological data registration support device
11: Biological data registration support device
12: Camera
13: Fingerprint scanner
14: Display device
15: Server
16: Biological data verification support device
17: Biological data registration support device
18: Biological data verification support device
19: Display device
20: Vein scanner
21: Biological data registration support device
22: Biological data registration support device
23: Biological data verification support device
100: Control portion
101: Transmitting portion
110: Receiving portion
111: Control portion
112: Transmitting portion
113: Control portion 120: Acquiring portion
130: Acquiring portion
140: Display portion
150: Database
151: Database
152: Verification method database
153: Receiving portion
154: Control portion
155: Transmitting portion
156: Service database
160: Display portion
161: Acquiring portion
180: Display portion
181: Acquiring portion
190: Display portion
200: Acquiring portion
210: Receiving portion
211: Control portion
212: Transmitting portion
230: Display device
231: Imaging device
1000: Biological data registration support system
1001: Biological data registration support system
1402: Processor
1404: Memory
1406: Storage
1408: Northbridge
1410: Expansion slot
1412: Southbridge
1414: Communication interface
1452: Processor
1454: Display
1456: Display interface
1458: Control interface
1460: Audio codec
1466: Communication interface
1468: Transceiver
1462: External interface
1464: Memory
1470: GPS receiving module
1472: Extension interface
1474: Extension memory
1610: Fingerprint scanner
1810: Fingerprint scanner
2300: Display portion

The invention claimed is:

1. An authentication data registration support system comprising:
a memory storing a computer program; and
one or more processors configured to run the computer program to perform:
obtaining a plurality of scenarios each corresponding to a service, each scenario including at least one verification method which is related to an authentication data;
determining two of the plurality of scenarios as a first registration scenario and a second registration scenario for the service based on request information;
acquiring input authentication data related to the at least one verification method of the first registration scenario and the second registration scenario;
when the first registration scenario is used for the service, collating the input authentication data with the authentication data related to the at least one verification method of the first registration scenario;
when the first registration scenario is not used for the service, collating the input authentication data with the authentication data related to the at least one verification method of the second registration scenario; and
in case that the verification is successful, providing the service corresponding to the registration scenario.

2. The authentication data registration support system according to claim 1, further comprising a display device, wherein the one or more processors are further configured to run the computer program to perform causing the display device to display one of the plurality of the scenarios and at least one verification method included in the candidate scenario.

3. The authentication data registration support system according to claim 1, wherein the first authentication data includes biological data input to the client terminal.

4. The authentication data registration support system according to claim 1, wherein the at least one verification method includes a password authentication method.

5. The authentication data registration support system according to claim 1, further comprising a display device, wherein the one or more processors are further configured to run the computer program to perform causing the display device to display information which prompts the provision of biological data regarding the verification method included in the first registration scenario and, in response to a request to modify the first registration scenario, to perform causing the display device to display information which prompts the provision of biological data regarding the verification method included in the second registration scenario.

6. An authentication method comprising:
obtaining a plurality of scenarios each corresponding to a service, each scenario including at least one verification method which is related to an authentication data;
determining two of the plurality of scenarios as a first registration scenario and a second registration scenario for the service based on request information;
acquiring input authentication data related to the at least one verification method of the first registration scenario and the second registration scenario;
when the first registration scenario is used for the service, collating the input authentication data with the authentication data related to the at least one verification method of the first registration scenario;
when the first registration scenario is not used for the service, collating the input authentication data with the authentication data related to the at least one verification method of the second registration scenario; and
in case that the verification is successful, providing the service corresponding to the registration scenario.

7. A non-transitory computer-readable medium storing an authentication data registration support program that causes a computer to execute:
obtaining a plurality of scenarios each corresponding to a service, each scenario including at least one verification method and which is related to an authentication data;
determining two of the plurality of scenarios as a first registration scenario and a second registration scenario for the service based on request information;
acquiring input authentication data related to the at least one verification method of the first registration scenario and the second registration scenario;
when the first registration scenario is used for the service, collating the input authentication data with the authentication data related to the at least one verification method of the first registration scenario;

when the first registration scenario is not used for the service, collating the input authentication data with the authentication data related to the at least one verification method of the second registration scenario; and in case that the verification is successful, providing the service corresponding to the registration scenario.

\* \* \* \* \*